United States Patent
Inoe et al.

(10) Patent No.: US 10,896,563 B2
(45) Date of Patent: Jan. 19, 2021

(54) GATE SYSTEM CONTROL DEVICE AND METHOD FOR CONTROLLING GATE SYSTEM

(71) Applicant: Panasonic Intellectual Property Management Co., Ltd., Osaka (JP)

(72) Inventors: Masanobu Inoe, Osaka (JP); Yuki Kobayashi, Osaka (JP); Kentaro Matsumoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/440,413

(22) Filed: Jun. 13, 2019

(65) Prior Publication Data

US 2019/0295341 A1 Sep. 26, 2019

Related U.S. Application Data

(63) Continuation of application No. PCT/JP2017/043397, filed on Dec. 4, 2017.

(30) Foreign Application Priority Data

Dec. 16, 2016 (JP) .................. 2016-244877

(51) Int. Cl.
*G07C 9/00* (2020.01)
*G06K 17/00* (2006.01)
(Continued)

(52) U.S. Cl.
CPC .......... *G07C 9/20* (2020.01); *G06K 17/0022* (2013.01); *G07B 15/00* (2013.01); *G07C 9/00* (2013.01);
(Continued)

(58) Field of Classification Search
CPC ........ G07C 9/20; G07C 9/00; G07C 2011/04; G06K 17/0022; G06K 19/10; G07B 15/00
See application file for complete search history.

(56) References Cited

U.S. PATENT DOCUMENTS 7,546,957 B2 * 6/2009 Melnik .................. G06Q 10/02
235/380
10,361,860 B2 * 7/2019 Mergen .............. G06K 9/00885
(Continued)

FOREIGN PATENT DOCUMENTS

JP 7-93612 4/1995
JP 2001-266187 9/2001
(Continued)

OTHER PUBLICATIONS

Extended European Search Report dated Nov. 13, 2019 in related European Patent Application No. 17880365.6.
(Continued)

*Primary Examiner* — Thomas D Alunkal
(74) *Attorney, Agent, or Firm* — Wenderoth, Lind & Ponack, L.L.P.

(57) ABSTRACT

A gate system control device is a gate system control device configured to control a gate system having an exit gate, and includes a first sensor, a second sensor, and a controller. The first sensor senses that a passport of a person who is in the gate system is placed on a placement region. The second sensor senses that the person is moving. The controller controls the gate system. When the first sensor senses that the passport is placed on the placement region and the second sensor senses that the person is moving to the exit gate, the controller causes the gate system to execute processing for notifying the person.

19 Claims, 27 Drawing Sheets

(51) Int. Cl.
*G07C 9/20* (2020.01)
*G07B 15/00* (2011.01)
*G06K 19/10* (2006.01)
*G07C 11/00* (2006.01)

(52) U.S. Cl.
CPC .......... *G06K 19/10* (2013.01); *G07C 2011/04* (2013.01)

(56) References Cited

U.S. PATENT DOCUMENTS

| | | | |
|---|---|---|---|
| 2006/0190974 A1* | 8/2006 | Lee | H04N 21/44218 725/87 |
| 2009/0090777 A1* | 4/2009 | Ness | G07C 9/257 235/441 |
| 2010/0308108 A1* | 12/2010 | Choi | G07C 9/257 235/382 |
| 2013/0148914 A1* | 6/2013 | Blasczak | H04N 1/00771 382/313 |
| 2016/0080589 A1 | 3/2016 | Talwerdi | |
| 2017/0070501 A1* | 3/2017 | Saito | H04L 63/0861 |
| 2018/0018838 A1* | 1/2018 | Fankhauser | G06K 19/06046 |

FOREIGN PATENT DOCUMENTS

| | | |
|---|---|---|
| JP | 2007-249819 | 9/2007 |
| JP | 2016-53896 | 4/2016 |
| JP | 2016-130961 | 7/2016 |

OTHER PUBLICATIONS

International Search Report (ISR) dated Feb. 13, 2018 in International (PCT) Application No. PCT/JP2017/043397.

* cited by examiner

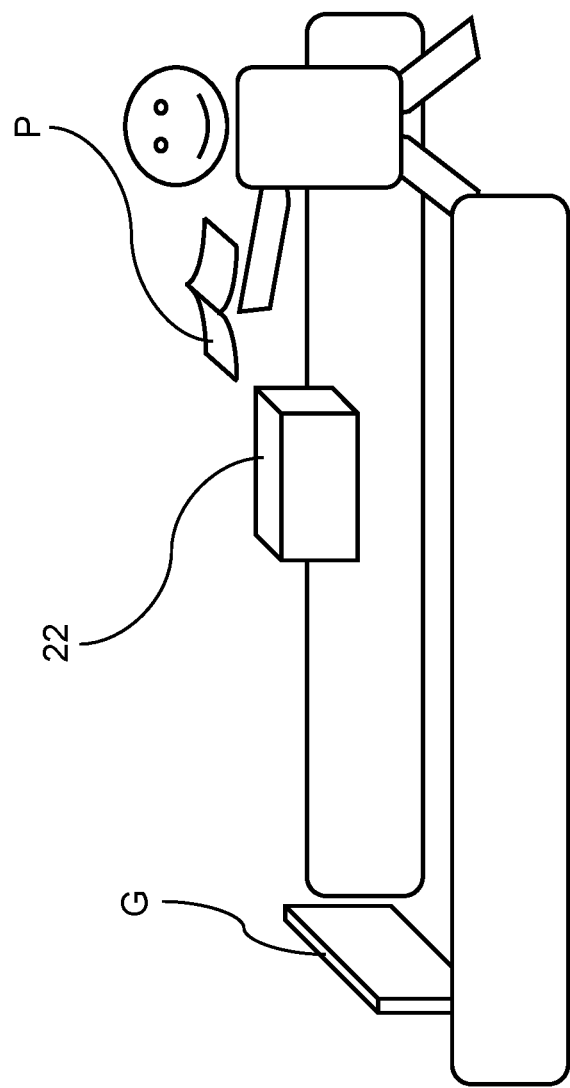

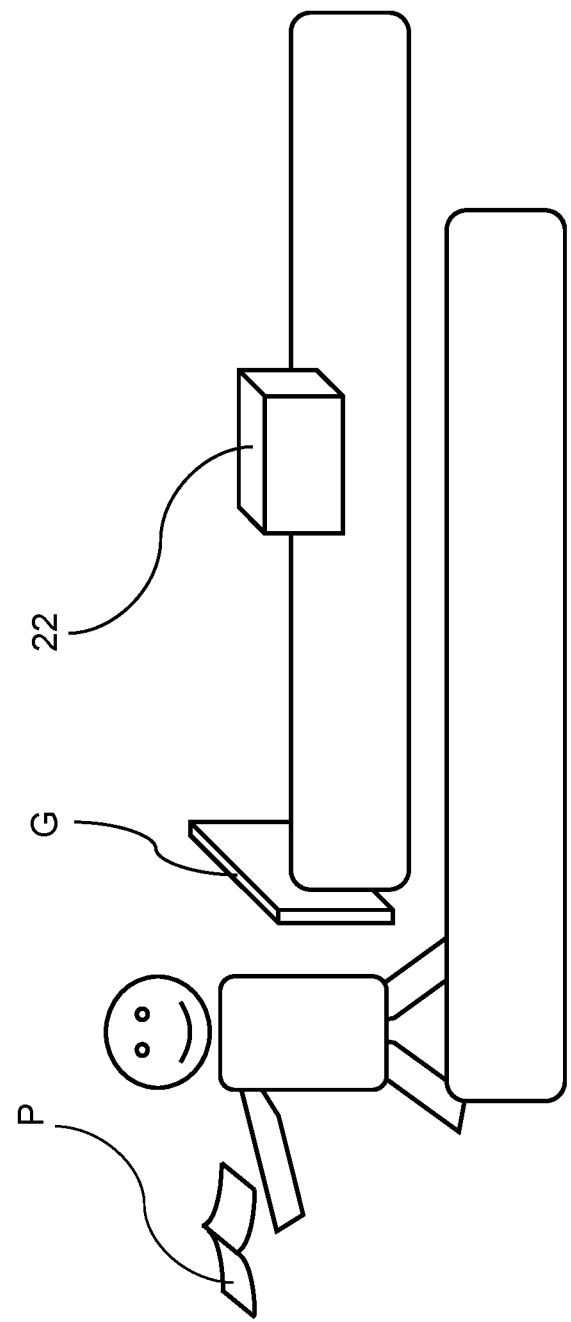

GATE SYSTEM CONTROL DEVICE AND METHOD FOR CONTROLLING GATE SYSTEM

TECHNICAL FIELD

The present disclosure relates to a gate system control device and a method for controlling a gate system.

BACKGROUND ART

Automatic inspection of emigration and immigration or the like using a passport with an integrated circuit (IC) chip embedded has been performed. For example, in PTL 1, there has been proposed an entrance management inspection system that permits entrance when the above-mentioned inspection is passed.

CITATION LIST

Patent Literature

PTL 1: Unexamined Japanese Patent Publication No. 2007-249819

SUMMARY OF THE INVENTION

However, in a conventional technique disclosed in PLT 1, automatic inspection is performed by placing a passport on a reading device. Therefore, while there is a case of exit with the passport mislaid, there is no consideration for this case.

The present disclosure provides a gate system control device or the like that can prevent a passport from being mislaid.

A gate system control device according to one aspect of the present disclosure is a gate system control device for controlling a gate system having an exit gate, and includes a first sensor, a second sensor, and a controller. The first sensor senses that a passport of a person who is in the gate system is placed in a placement region. The second sensor senses that the person is moving. The controller controls the gate system. When the first sensor senses that the passport is placed in the placement region and the second sensor senses that the person is moving to the exit gate, the controller causes the gate system to execute processing for notifying the person.

These general or specific aspects may be realized by systems, methods, integrated circuits, computer programs, or computer readable recording mediums such as CD-ROMs, or may be realized by an arbitrary combination of the systems, methods, integrated circuits, computer programs, and recording mediums.

The gate system control device or the like in the present disclosure can prevent a passport from being mislaid.

BRIEF DESCRIPTION OF DRAWINGS

FIG. 1A is an external appearance view showing one example in which a user enters a gate system of the present disclosure.

FIG. 1B is an external appearance view showing one example in which the user exits without mislaying the passport in the gate system of the present disclosure.

DESCRIPTION OF EMBODIMENT

Next, an exemplary embodiment of a gate system control device according to the present disclosure will be described with reference to the drawings. The following exemplary embodiment merely exemplifies the gate system control device according to the present disclosure. Accordingly, the present disclosure is defined by wording of claims with reference to the following exemplary embodiment, and is not limited to the following exemplary embodiment only. Thus, of the constituent elements in the following exemplary embodiment, constituent elements not recited in any of independent claims indicating the most generic concept of the present disclosure are not necessarily required for achieving the problem of the present disclosure, and are described as constituent elements configuring a more preferable exemplary embodiment.

Moreover, the drawings are schematic views resulting from emphasis, omission, or adjustment of ratios for describing the present disclosure, so that actual shapes, positional relations, and ratios may be different.

Exemplary Embodiment

Figure 1C:
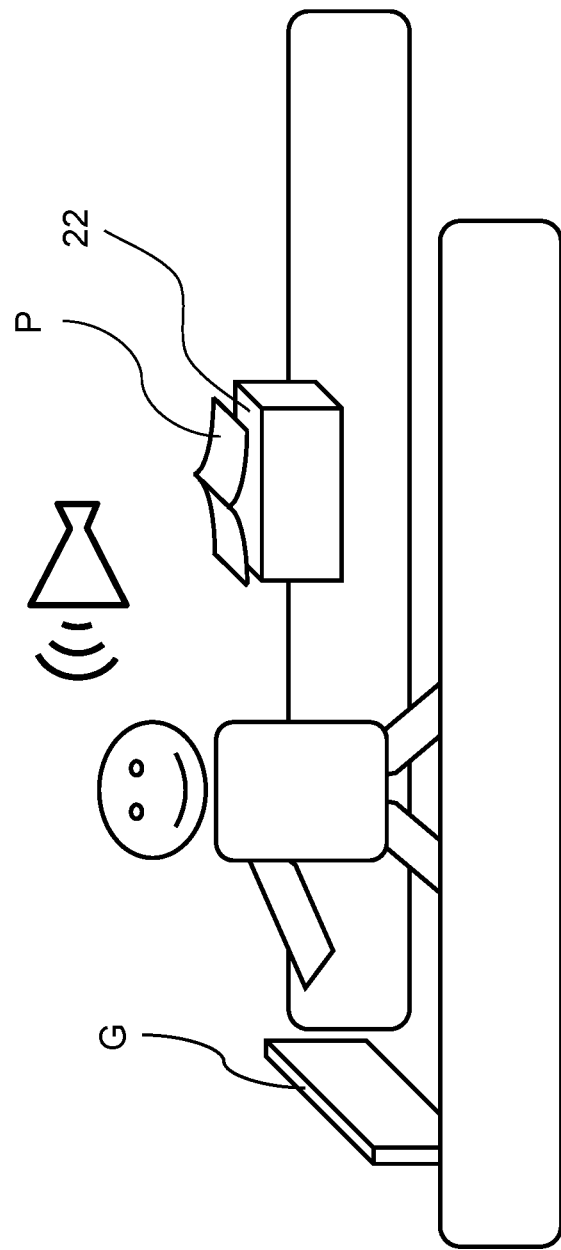
FIG. 1C is an external appearance view showing one example in which the user exits with the passport mislaid in the gate system of the present disclosure.

In the present exemplary embodiment, a gate system has an exit gate for a person who holds a passport to leave (exit) from, and can open and close the exit gate. This gate system will be described.
[External Appearance of Gate System]
FIG. 1A, FIG. 1B, and FIG. 1C are external appearance views showing one example of the gate system of the present disclosure.

First, FIG. 1A is an external appearance view showing one example in which a user enters the gate system of the present disclosure.

A person who holds passport P enters the gate system, and places passport P on placement region 22 that the gate system has, by which authentication of passport P is performed.

Next, FIG. 1B is an external appearance view showing one example in which the user exits without mislaying the passport in the gate system of the present disclosure.

When the person is authenticated by means of placed passport P, exit gate G opens. The person who holds passport P picks up passport P, and passes through exit gate G, which allows the person to exit.

Next, FIG. 1C is an external appearance view showing one example in which the user exits with the passport mislaid in the gate system of the present disclosure.

When the person is authenticated by means of placed passport P, exit gate G opens as in FIG. 1B. However, if the person tries to exit with passport P placed, the gate system performs caution announcement about mislaying. In order to make the person who holds passport P realize the mislaying, the gate system of the present disclosure performs the caution announcement, for example, notifies the person of the mislaying by emitting a sound, disables the person to exit by closing exit gate G, and so on.

Next, in the present exemplary embodiment, a gate system control device for controlling the gate system will be described.
[Configuration of Gate System Control Device 1]
First, a configuration of gate system control device 1 in the present disclosure will be described.

Figure 2:
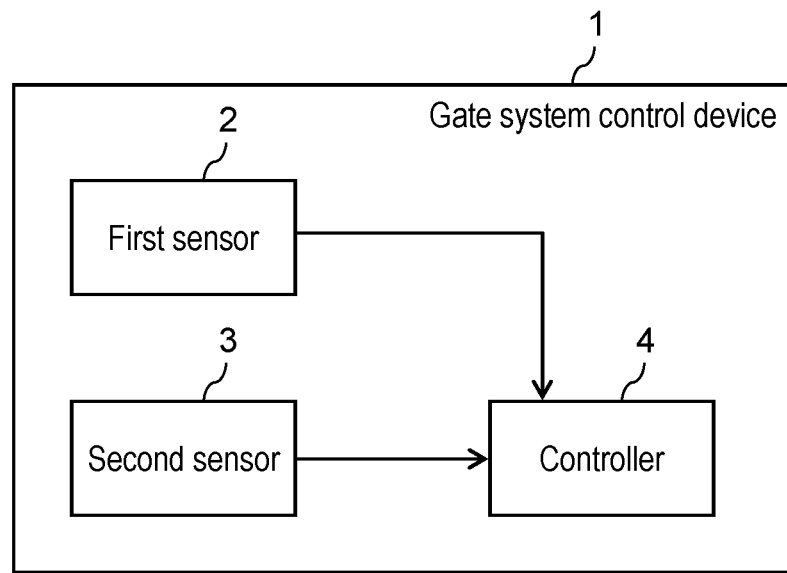
FIG. 2 is a functional block diagram showing a configuration of a gate system control device of the present disclosure.

FIG. 2 is a functional block diagram showing the configuration of gate system control device 1 of the present disclosure. Gate system control device 1 shown in FIG. 2 includes first sensor 2, second sensor 3, and controller 4.

First sensor 2 senses that the passport of the person who is in the gate system is placed on the placement region. More specifically, first sensor 2 senses that the passport of the person is placed on the placement region, based on an image of the placement region where the passport is placed. Here, the image of the placement region is an image captured by an image sensor, for example.

Second sensor 3 senses that the person is moving. More specifically, second sensor 3 senses exit timing when the person exits from the exit gate. Here, the exit timing is timing when the person goes to the exit gate, and the person exits from the exit gate.

Controller 4 controls the gate system. Controller 4 outputs a signal to cause the gate system to execute processing for making the person realize the mislaying, that is, a situation where the passport remains placed at the exit timing. Namely, when first sensor 2 senses that the passport is placed on the placement region and second sensor 3 senses that the person is moving, controller 4 causes the gate system to execute processing for notifying the person.

Figure 3:
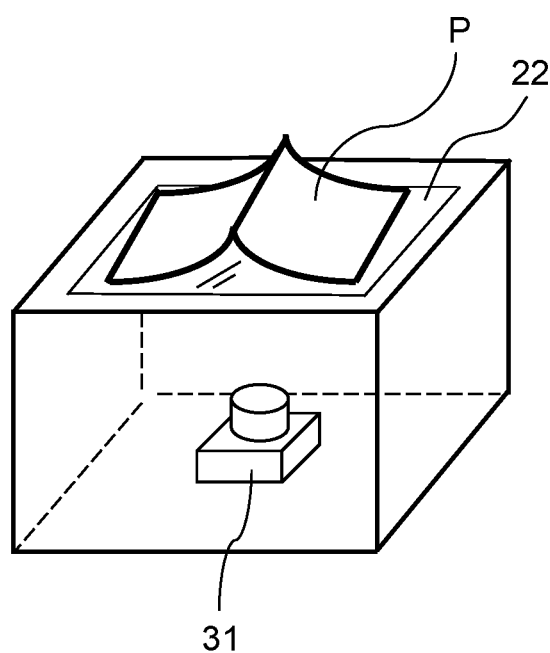
FIG. 3 is an external appearance view showing one example of a reading device in the gate system of the present disclosure.

FIG. 3 is an external appearance view showing one example of a reading device in the gate system of the present disclosure.

The reading device has placement region 22. For example, placement region 22 is made of a transparent glass surface, and passport P is placed on placement region 22. Therefore, image sensor 31 may image the glass surface, that is, placement region 22 from below the glass surface.

In this manner, gate system control device 1 in the present disclosure can, for example, cause the gate system to half-close or fully-close the exit gate, or to announce the mislaying to the person. This can prevent the mislaying of the passport of the person.

[Operation of Gate System Control Device 1]

Next, operation of gate system control device 1 configured as described above will be described.

Figure 4:
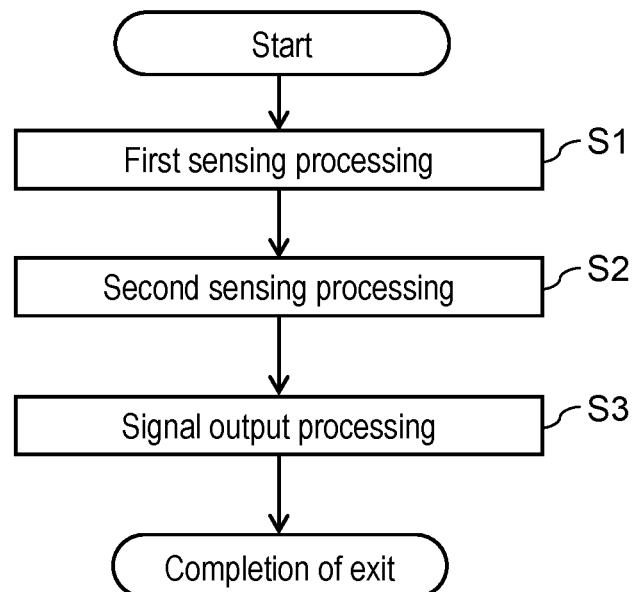
FIG. 4 is a flowchart showing operation of the gate system control device of the present disclosure.

FIG. 4 is a flowchart showing the operation of gate system control device 1 shown in FIG. 2.

First, as shown in FIG. 4, gate system control device 1 executes first sensing processing (S1). Specifically, first sensor 2 of gate system control device 1 senses that the passport of the person who is in the gate system is placed on the placement region.

Next, gate system control device 1 executes second sensing processing (S2). Specifically, second sensor 3 of gate system control device 1 senses the exit timing when the person exits from the exit gate.

Next, gate system control device 1 executes signal output processing (S3). Specifically, controller 4 of gate system control device 1 outputs the signal to cause the gate system to execute processing for making the person realize the mislaying, that is, the situation where the passport remains placed at the exit timing.

Next, gate system 100 and gate system control device 10 in the present exemplary embodiment will be described.

[Configuration of Gate System 100]

Figure 5:
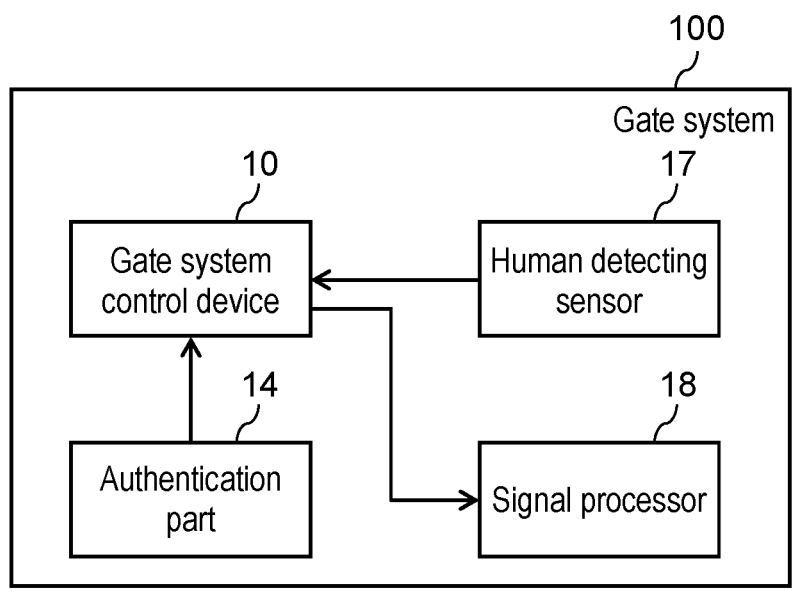
FIG. 5 is a diagram showing one example of a configuration of the gate system in an exemplary embodiment.
Figure 6:
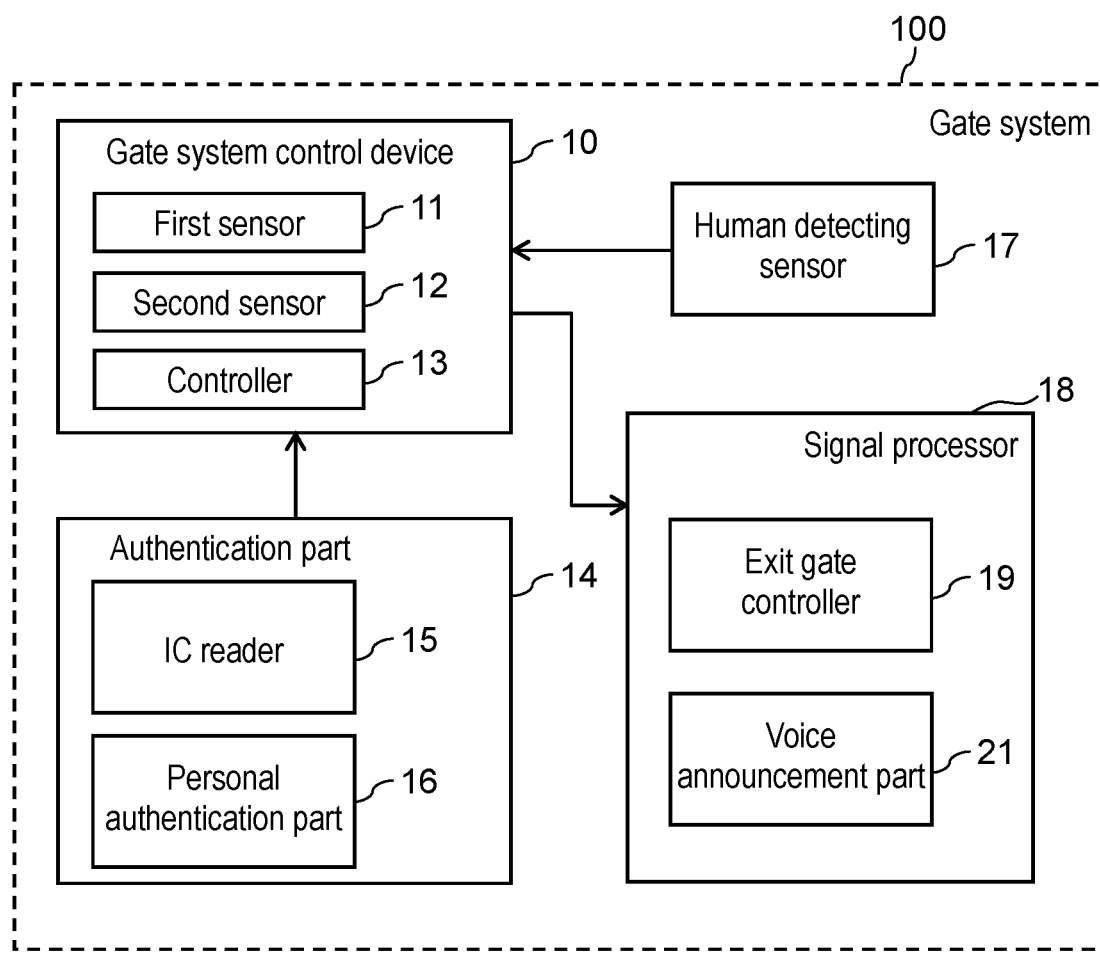
FIG. 6 is a diagram showing one example of a detailed configuration of the gate system shown in FIG. 5.

FIG. 5 is a diagram showing one example of a configuration of gate system 100 in the present exemplary embodiment. FIG. 6 is a diagram showing one example of a detailed configuration of gate system 100 shown in FIG. 5.

Gate system 100 shown in FIG. 5 includes gate system control device 10, authentication part 14, human detecting sensor 17, and signal processor 18.

<<Gate System Control Device 10>>

Gate system control device 10 includes first sensor 11, second sensor 12, and controller 13, as shown in FIG. 6.

First sensor 11 is one specific example of first sensor 2, and senses that the passport of the person who is in the gate system is placed on the placement region. In the present exemplary embodiment, first sensor 11 senses that the passport is placed on the placement region, based on the image of the placement region where the passport is placed, the image being captured by the image sensor. Here, the placement region is a rectangular region. A length of a longer side of the placement region is larger than a length of a longer side of the passport in an opened state. Moreover, a length of a shorter side of the placement region is larger than a length of a shorter side of the passport in the opened state, and is smaller than the length of the longer side of the passport in the opened state.

Figure 7:
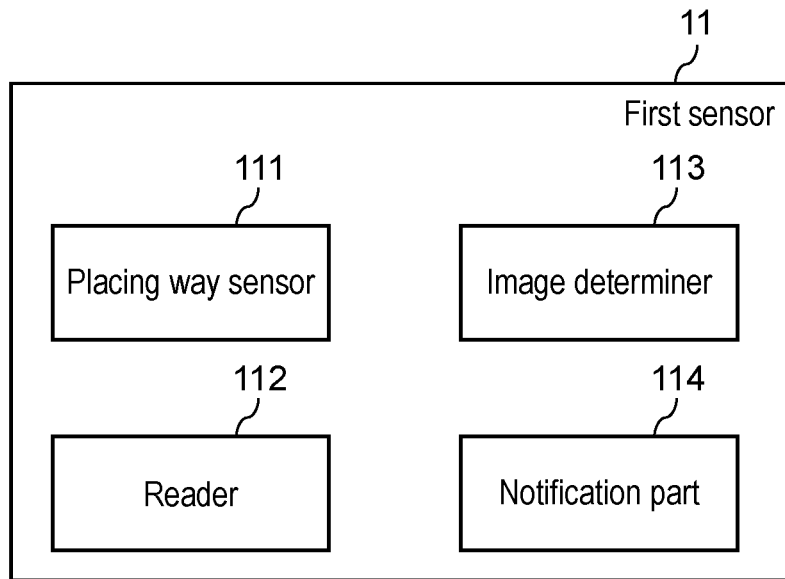
FIG. 7 is a diagram showing one example of a detailed configuration of a first sensor shown in FIG. 6.

FIG. 7 is a diagram showing one example of a detailed configuration of first sensor 11 shown in FIG. 6.

As shown in FIG. 7, first sensor 11 includes placing way sensor 111, reader 112, image determiner 113, and notification part 114.

Placing way sensor 111 senses a placing way of the passport on the placement region, based on the image of the placement region captured by the image sensor. As the placing way of the passport, there is horizontal placement, vertical placement, or diagonal placement. Namely, placing way sensor 111 senses whether or not the passport is placed with the horizontal placement, based on the image of the placement region. In the following, the placing way of the passport on the placement region when the longer side of the passport in the opened state is along the longer side of the placement region is referred to as the horizontal placement. Moreover, the placing way of the passport on the placement region when the shorter side of the passport in the opened state is along the longer side of the placement region is referred to as the vertical placement. The placing way of the passport on the placement region in a state other than the horizontal placement and the vertical placement is referred to as the diagonal placement. When placing way sensor 111 senses that the placing way of the passport on the placement region is the horizontal placement in the image of the placement region captured by the image sensor, first sensor 11 senses that the passport is placed. Namely, when the passport is placed on the placement region such that the longer side of the passport in the opened state is along the longer side of the placement region, placing way sensor 111 senses that the passport is placed with the horizontal placement.

Reader 112 reads information indicated in the passport, based on the image of the passport captured by the image sensor. Here, after placing way sensor 111 senses that the placing way of the passport is the horizontal placement, reader 112 reads the information indicated in the passport, based on the image of the passport captured by the image sensor. Namely, after placing way sensor 111 senses that the passport is placed, reader 112 reads the information indicated in the passport. Moreover, reader 112 may determine whether an orientation of the passport is inverted, based on characteristics peculiar to the passport in the image of the passport captured by the image sensor. When the passport is inverted, reader 112 may rotate the image of the passport by 180° to read the information indicated in the passport. The characteristics in this case may be a machine readable zone (MRZ), may be a position of a photograph or a hologram, or may be an orientation of a page number, a photograph, letters, or the like. Moreover, the information indicated in the passport is, for example, a face photograph attached to the passport, a name, a passport number, a date of birth, a nationality, and the like described in the MRZ.

Reader 112 may read the information indicated in the passport, based on the image rotated by 90° even if the orientation of the passport is vertical, based on the characteristics peculiar to the passport captured in the image. Furthermore, reader 112 may determine whether or not the person is an object person who can use gate system 100, based on the information in the MRZ of the passport.

Image determiner 113 determines a situation of an installation place of the image sensor. Image determiner 113 may determine environmental illuminance, which is illuminance around the installation place of the image sensor, or may determine whether or not an average of luminance in a peripheral region of the placement region is a threshold or higher. This allows first sensor 11 to adjust exposure of the image sensor in accordance with the situation determined by image determiner 113. A person in charge who maintains gate system control device 10 may manually adjust the exposure of the image sensor.

When placing way sensor 111 senses that the placing way of the passport on the placement region is other than the horizontal placement, notification part 114 notifies the person that the placing way of the passport is other than the horizontal placement. Moreover, when the person is not the object person who can use gate system 100, based on the information read by reader 112, notification part 114 may notify the person that he or she is not the object person.

Notification part 114 may notify the person in voice, using the speaker or the like. Furthermore, for example, when the person is a foreigner, and is not the object person who can use gate system 100, notification part 114 may notify the person of the fact in a mother tongue of the person.

In this manner, first sensor 11 senses that the passport is placed, based on the image of the placement region where the passport is placed, the image being captured by the image sensor. However, a configuration of first sensor 11 is not limited to the foregoing. First sensor 11 may sense that the passport is placed by means of light such as infrared light, or by means of a switch. For example, the gate system emits the infrared light in a direction crossing the placement region, and receives the infrared light. The passport placed on the placement region may block part of the infrared light, by which first sensor 11 may sense that the passport is placed on the placement region. Moreover, first sensor 11 may include a switch having a projected portion in part of the placement region. The passport placed on the placement region may press the projected portion, by which first sensor 11 may sense that the passport is placed. Moreover, a touch sensor may be provided in the placement region, by which first sensor 11 may sense that the passport is placed on the placement region.

Second sensor 12 is one specific example of second sensor 3, and senses the exit timing when the person exits from the exit gate. In the exemplary embodiment, second sensor 12, for example, acquires a signal sensed by human detecting sensor 17 installed around the exit gate through a network. This allows second sensor 12 to sense the exit timing when the person exits from the exit gate. The network may be a wired network or may be a wireless network.

Controller 13 is one specific example of controller 4, and outputs a signal to cause gate system 100 to execute processing for making the person realize the mislaying. In the exemplary embodiment, controller 13 outputs, to signal processor 18, the signal to cause the processing for making the person realize the mislaying to be executed, and causes signal processor 18 to execute the processing for making the person realize the mislaying. Moreover, controller 13 outputs the signal to signal processor 18 after authentication part 14 completes personal authentication of the passport of the person and the person starts the movement for passing through the exist gate, and at the exit timing when the person exits from the exit gate.

Figure 8:
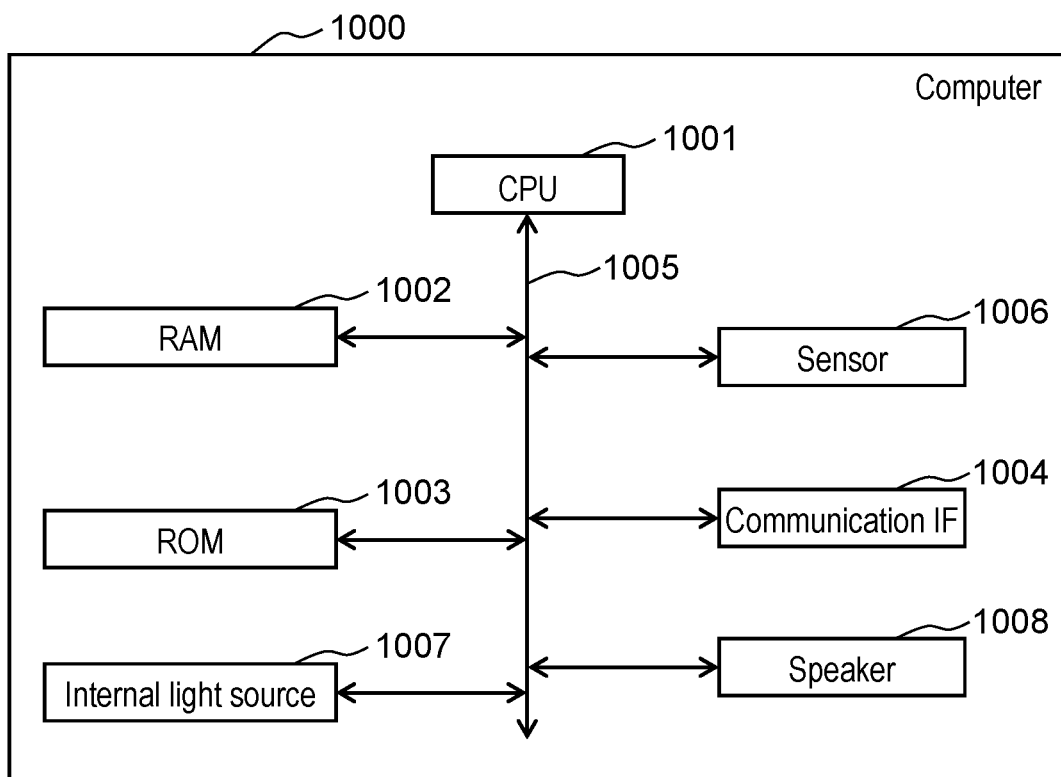
FIG. 8 is a diagram showing one example of a hardware configuration of the gate system control device in the exemplary embodiment.

FIG. 8 is a diagram showing one example of a hardware configuration of gate system control device 10 in the exemplary embodiment.

Namely, gate system control device 10 is implemented by computer 1000. Here, as shown in FIG. 8, computer 1000 includes central processing unit (CPU) 1001, read only memory (ROM) 1003, random access memory (RAM) 1002, communication interface (IF) 1004, sensor 1006, internal light source 1007, and speaker 1008. CPU 1001, ROM 1003, RAM 1002, communication IF 1004, sensor 1006, internal light source 1007, and speaker 1008 are connected by communication bus 1005.

CPU 1001 is a central processing unit, and executes a control program and the like stored in ROM 1003. Thereby, CPU 1001 controls, for example, communication IF 1004, sensor 1006, internal light source 1007, speaker 1008 and the like to execute various types of processing.

ROM 1003 is a read only memory, and holds programs and data in advance.

RAM 1002 is a random access memory, and is used to store data and the like in executing the programs. RAM 1002 may be a storage such as a hard disk drive or a solid-state drive.

Communication IF 1004 is an interface for communicating with authentication part 14, human detecting sensor 17, and signal processor 18 in a wireless or wired manner, and, is a communication circuit, for example.

Sensor 1006 is a sensor such as an image sensor, and is controlled by CPU 1001. When sensor 1006 is an image sensor, sensor 1006 may perform not only photographing by visible light but photographing by infrared (IR).

Internal light source 1007 is a light source used by sensor 1006, and is made of, for example, a light-emitting diode (LED), a lamp, or the like. Internal light source 1007 is used for sensor 1006 to read the information indicated in the passport. Internal light source 1007 is controlled by CPU 1001 to be turned on or off.

Speaker 1008 is used to notify the person that the placing way of the passport is other than the horizontal placement when the placing way of the passport on the placement region is other than the horizontal placement. Speaker 1008 is controlled by CPU 1001.

<<Authentication Part 14>>

Authentication part 14 performs personal authentication of the person carrying the passport. In the present exemplary embodiment, as shown in FIG. 6, authentication part 14 includes IC reader part 15 and personal authentication part 16. IC reader part 15 reads information stored in an IC chip of the passport. IC reader part 15 includes a well-known configuration to read the information from the IC chip of the passport in a noncontact manner. In the present exemplary embodiment, IC reader part 15 reads information stored in the IC chip of the passport placed on the placement region.

Personal authentication part 16 performs personal authentication as to whether or not a person indicated by the information read by IC reader part 15 matches the person who carries the passport. For example, when gate system 100 further includes a camera, personal authentication part 16 may collate a face of the person who carries the passport imaged by the camera, and a face of the person included in the information read by IC reader part 15 to authenticate the identical person. When gate system 100 can acquire a fingerprint, a vein, a retina, or the like of the person who holds the passport, personal authentication part 16 may perform biometric authentication in which these fingerprint, vein, retina or the like, and a fingerprint, a vein, a retina or the like included in the information read by IC reader part 15 are collated.

<<Human Detecting Sensor 17>>

Human detecting sensor 17 is a sensor configured to sense a person approaching the exit gate of gate system 100, and transmits a signal indicating a sensing result to gate system control device 10. Human detecting sensor 17 may be configured of a camera. As human detecting sensor 17, an infrared sensor can be used. Namely, second sensor 12 may sense that the person is moving, based on output of the infrared sensor.

<<Signal Processor 18>>

Signal processor 18 executes the processing for making the person realize the mislaying in accordance with a signal outputted from gate system control device 10. In the present exemplary embodiment, signal processor 18 includes exit gate controller 19 and voice announcement part 21, as shown in FIG. 6.

Exit gate controller 19 controls opening and closing of the exit gate in accordance with the signal outputted from gate system control device 10.

Voice announcement part 21 performs the announcement in voice that makes the person realize the mislaying in accordance with the signal outputted from gate system control device 10.

[Operation of Gate System 100]

Next, operation of gate system 100 configured as described above will be described.

Figure 9:
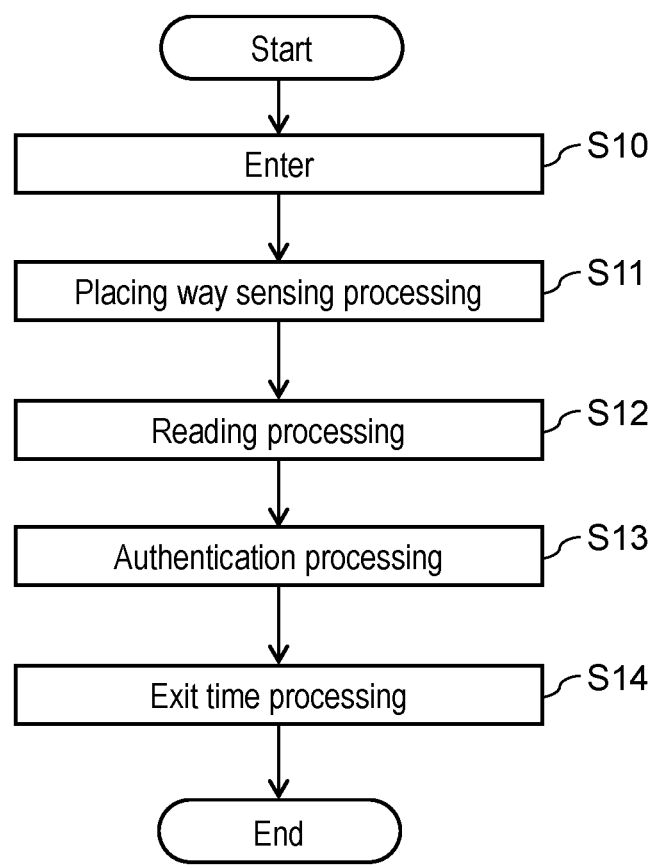
FIG. 9 is a flowchart showing operation of the gate system shown in FIG. 6.

FIG. 9 is a flowchart showing the operation of gate system 100 shown in FIG. 6. Gate system 100 confirms whether or not the person is the person who genuinely holds the passport, based on the information held in the passport of the person who has passed through an entrance gate. Gate system 100 opens the exit gate when the person can be authenticated.

First, when the entrance gate opens, the person enters a region inside gate system 100 from the entrance gate (S10). The person places the passport on the placement region for placing the passport. Next, gate system 100 executes placing way sensing processing for sensing the placing way of the passport on the placement region (S11). Gate system 100 senses the placing way of the passport on the placement region, and senses that the passport is placed if the placing way of the passport is the horizontal placement. Next, if gate system 100 senses that the passport is placed, reading processing for reading the information indicated in the passport is executed (S12). The information indicated in the passport is, for example, a photograph and the like. The information indicated in the read passport is sent to a person in charge such as an inspector and the like staying near the exit gate, and is used to confirm the person passing through the exit gate. Next, gate system 100 executes authentication processing for confirming whether or not the person is the person who genuinely holds the passport, based on the information held in the passport (S13).

If the authentication processing (S13) ends, and the person starts moving to pass through the exit gate, gate system 100 executes exit time processing (S14). Namely, if gate system 100 senses the mislaying, gate system 100 executes the processing for making the person realize the mislaying, and if gate system 100 does not sense the mislaying, gate system 100 executes processing for allowing the person to pass through the exit gate without stopping.

As described above, gate system 100 can prevent the person from mislaying the passport.

Hereinafter, a plurality of aspects of gate system 100 will be described as examples.

First Example

In the present example, a case where the processing for making the person realize the mislaying is processing for closing the exit gate will be described.

Figure 10:
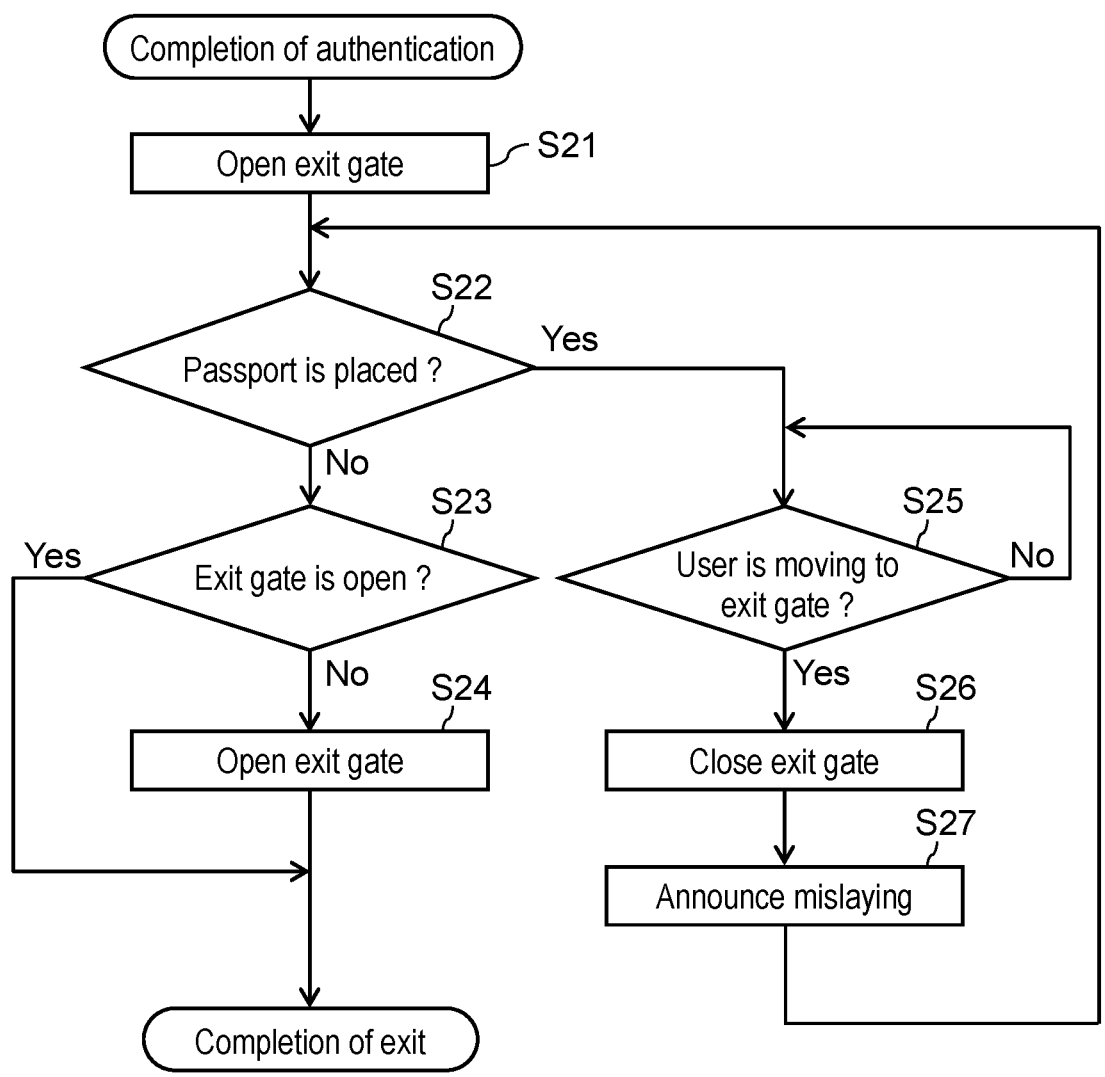
FIG. 10 is a flowchart showing operation of the gate system in a first example.

FIG. 10 is a flowchart showing operation of gate system 100 in a first example. The flowchart shown in FIG. 10 corresponds to one example of details of the exit time processing (S14) shown in FIG. 9.

Namely, suppose that in the authentication processing (S13) shown in FIG. 9, the authentication processing by authentication part 14 has been completed, and that the person starts moving to pass through the exit gate. In this case, first, exit gate controller 19 executes processing for opening the exit gate (S21).

Next, gate system 100 confirms whether the passport is placed on the placement region (S22). More specifically, first sensor 11 of gate system control device 10 senses whether or not the passport is in a state placed on the placement region.

In S22, if the passport is not placed on the placement region (No in S22), gate system 100 advances to processing in S23. If the exit gate has not opened yet (No in S23), exit gate controller 19 executes the processing for opening the exit gate. In S23, if the exit gate has already opened (Yes in S23), the processing is ended.

Moreover, in S22, if the passport is placed on the placement region (Yes in S22), gate system 100 determines whether the person is moving to the exit gate (S25). More specifically, second sensor 12 senses whether the person is moving to the exit gate, and it is the exit timing when the person exits from the exit gate, based on the signal sensed by human detecting sensor 17.

In S25, if the person is moving to the exit gate (Yes in S25), exit gate controller 19 executes processing for closing the exit gate (S26). More specifically, when first sensor 11 senses that the passport is placed at the exit timing sensed by second sensor 12, controller 13 outputs a signal to close the exit gate as the processing for making the person realize the mislaying. Exit gate controller 19 performs control to close the exit gate in accordance with the signal output by controller 13.

Furthermore, subsequently to the processing in S26, or at the same timing as the processing in S26, gate system 100 may perform the mislaying announcement that makes an announcement in voice to make the person realize the mislaying (S27). More specifically, controller 13 may output a signal to issue an alarm notifying that the passport remains placed to cause voice announcement part 21 to generate the alarm.

As described above, in the present example, if the person is about to leave the exit gate with the passport mislaid, the exit gate may be closed to make the person realize the mislaying. Namely, controller 13 causes the gate system to execute the processing for closing the exit gate as the processing for notifying the person.

This can prevent the person from immigrating or emigrating with the passport mislaid.

Here, controller 13 outputs the signal to fully-close the exit gate, and controls so as to cause exit gate controller 19 to fully-close the exit gate. However, the control by controller 13 is not limited thereto. Controller 13 may output a signal to close the exit gate half or more, and control so as to cause exit gate controller 19 to close the exit gate half or more. In this case, attention arousing to make the person realize the mislaying can be performed while preventing the person who has mislaid the passport from being caught by the exit gate.

Second Example

In the present example, a case where the processing for making the person realize the mislaying is processing of announcing a personal name in voice will be described.

Figure 11:
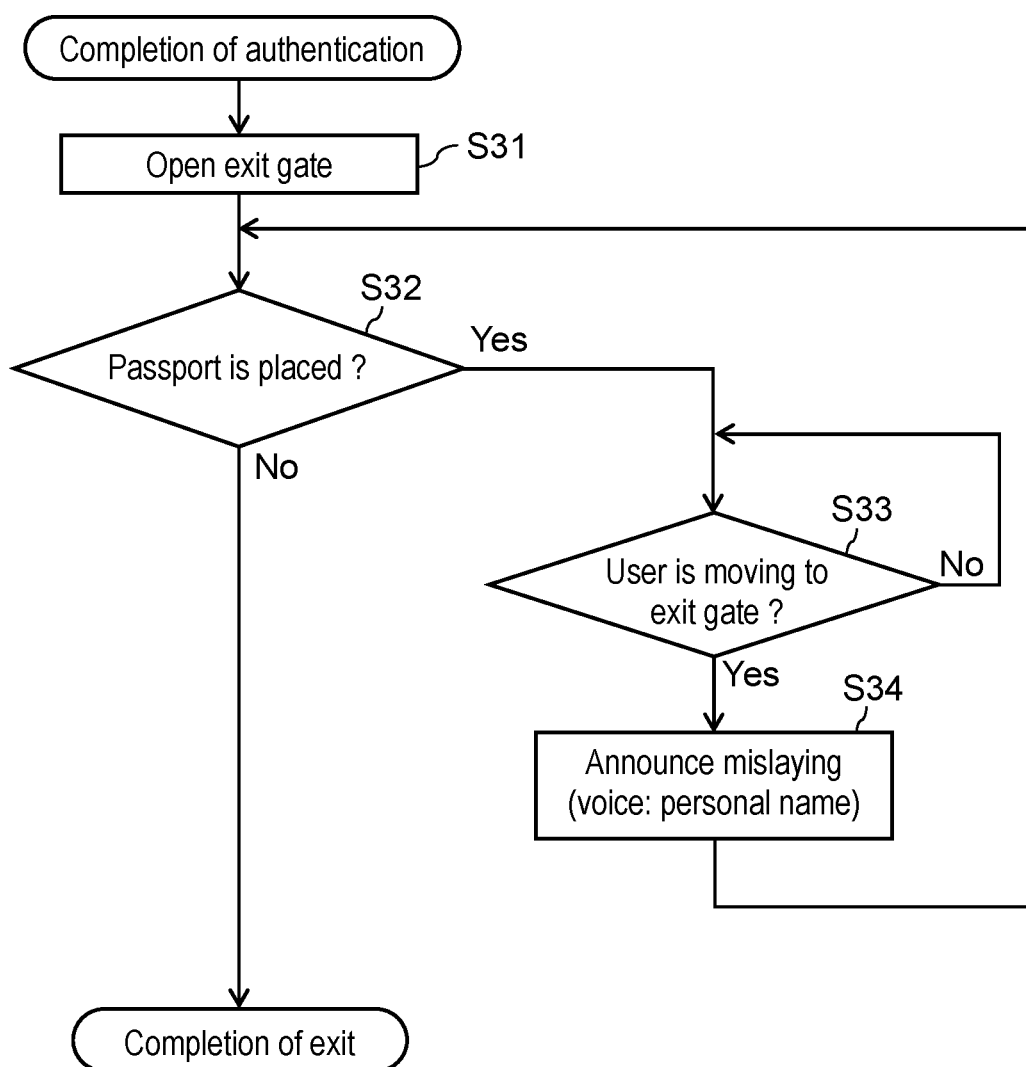
FIG. 11 is a flowchart showing operation of the gate system in a second example.

FIG. 11 is a flowchart showing operation of gate system 100 in a second example. The flowchart shown in FIG. 11 corresponds to one example of details of the exit time processing (S14) shown in FIG. 9.

Namely, suppose that in the authentication processing (S13) shown in FIG. 9, the authentication processing by authentication part 14 has been completed, and that the person starts moving to pass through the exit gate. In this case, first, exit gate controller 19 executes the processing for opening the exit gate (S31).

Next, gate system 100 confirms whether the passport is placed on the placement region (S32). More specifically, first sensor 11 of gate system control device 10 senses whether or not the passport is in the state placed on the placement region.

In S32, if the passport is not placed on the placement region (No in S32), the processing ends.

Moreover, in S32, if the passport is placed on the placement region (Yes in S32), gate system 100 determines whether the person is moving to the exit gate (S33). More specifically, second sensor 12 senses whether the person is moving to the exit gate, and it is the exit timing when the person exits from the exit gate, based on the signal sensed by human detecting sensor 17.

In S33, if the person is moving to the exit gate (Yes in S33), gate system 100 executes the processing for causing voice announcement part 21 to execute announcement in voice to make the person realize the mislaying (S34). More specifically, controller 13 may output a signal to utter a voice including the personal name of the person, and notifying that the passport remains placed, and cause voice announcement part 21 to utter the voice. The personal name of the person is acquired in the reading processing (S12) or the authentication processing (S13) shown in FIG. 9.

As described above, in the present example, when first sensor 11 senses that the passport is placed at the exit timing sensed by second sensor 12, controller 13 outputs the signal to utter the voice including the name of the person included in the passport, and notifying that the passport remains placed as the processing for making the person realize the mislaying. Namely, reader 112 may acquire the name of the person from the information indicated in the passport. Controller 13 may cause the gate system to execute the processing for uttering the voice including the name of the person as the processing for notifying the person.

This can prevent the person from immigrating or emigrating with the passport mislaid.

Third Example

In the present example, a case where the processing for making the person realize the mislaying is the processing for not opening the exit gate will be described. Hereinafter, a description will be given on the premise that when the person enters from the entrance gate, the exit gate is in a closed state.

Figure 12:
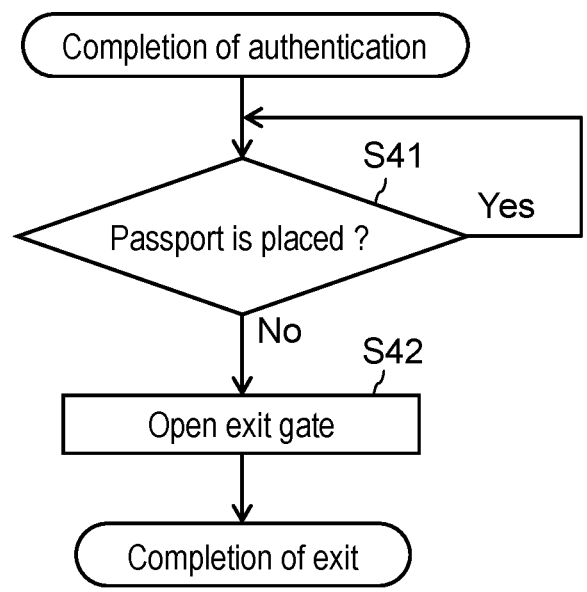
FIG. 12 is a flowchart showing operation of the gate system in a third example.

FIG. 12 is a flowchart showing operation of gate system 100 in a third example. The flowchart shown in FIG. 12 corresponds to one example of details of the exit time processing (S14) shown in FIG. 9.

Namely, suppose that in the authentication processing (S13) shown in FIG. 9, the authentication processing by authentication part 14 has been completed, and that the person starts moving to pass through the exit gate. In this case, first, gate system 100 confirms whether the passport is placed on the placement region (S41). More specifically, first sensor 11 of gate system control device 10 senses whether or not the passport is in the state placed on the placement region.

In S41, if the passport is not placed on the placement region (No in S41), gate system 100 opens the exit gate (S42). More specifically, if first sensor 11 senses a state where the passport is not placed on the placement region, controller 13 causes signal processor 18 to output a signal to open the exit gate. When acquiring this signal, exit gate controller 19 executes the processing for opening the exit gate.

On the other hand, if the passport is placed on the placement region in S41 (Yes in S41), the processing returns to the processing in S41. More specifically, if the passport is not placed on the placement region, gate system 100 may leave the exit gate closed without executing any processing. Moreover, if the passport is placed on the placement region, when first sensor 11 senses that the passport is placed at the exit timing sensed by second sensor 12, controller 13 may output a signal to leave the exit gate closed as the processing for making the person realize the mislaying. This allows exit gate controller 19 to execute the processing for keeping the exit gate in the closed state.

As described above, in the present example, if the person mislays the passport, the exit gate may not be opened to thereby make the person realize the mislaying.

This can prevent the person from immigrating or emigrating with the passport mislaid.

Fourth Example

In the present example, the gate system includes the entrance gate for the person who holds the passport to enter. Moreover, in the present example, signal processor 18 includes an entrance gate controller (not shown) configured to control opening and closing of the entrance gate in accordance with a signal output from gate system control device 10.

In the present example, a case where the processing for making the person realize the mislaying is processing for inhibiting a next person from entering without opening the entrance gate will be described. A description will be given on the premise that when the person enters from the entrance gate, the entrance gate is in a closed state.

Figure 13:
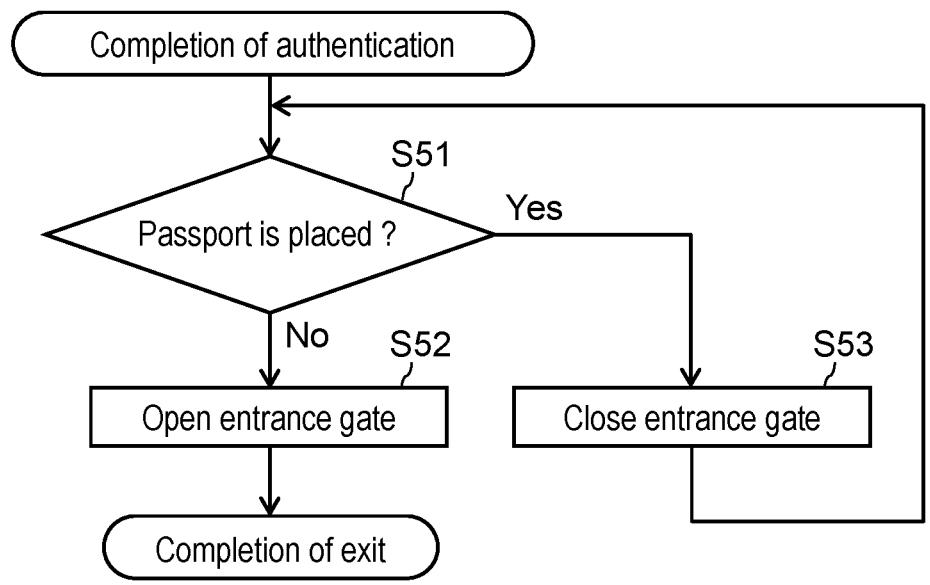
FIG. 13 is a flowchart showing operation of the gate system in a fourth example.

FIG. 13 is a flowchart showing operation of gate system 100 in a fourth example. The flowchart shown in FIG. 13 corresponds to one example of details of the exit time processing (S14) shown in FIG. 9.

Namely, suppose that in the authentication processing (S13) shown in FIG. 9, the authentication processing by authentication part 14 has been completed, and that the person starts moving to pass through the exit gate. In this case, first, gate system 100 confirms whether the passport is placed on the placement region (S51). More specifically, first sensor 11 of gate system control device 10 senses whether or not the passport is in the state placed on the placement region.

In S51, if the passport is not placed on the placement region (No in S51), gate system 100 opens the entrance gate (S52). More specifically, if first sensor 11 senses the state where the passport is not placed on the placement region, controller 13 outputs, to signal processor 18, a signal to open the entrance gate. Upon acquiring this signal, the entrance gate controller executes the processing for opening the entrance gate.

On the other hand, suppose that in S51 if the passport is placed on the placement region (Yes in S51), gate system 100 leaves the entrance gate closed (S53). The processing returns to the processing in S51. More specifically, if the passport is placed on the placement region, gate system 100 may leave the entrance gate closed without executing any processing. Moreover, if the passport is placed on the placement region, when first sensor 11 senses that the passport is placed at the exit timing sensed by second sensor 12, controller 13 may output a signal to leave the entrance gate closed as the processing for making the person realize the mislaying.

This allows the entrance gate controller to execute the processing for keeping the entrance gate in the closed state.

As described above, in the present example, if the person mislays the passport, leaving the entrance gate closed prevents a next person (a person) from entering. In this manner, the mislaying may be realized. This can prevent the next person from taking the passport and leaving or the like.

Moreover, this can prevent the person from immigrating or emigrating with the passport mislaid.

Fifth Example

In the present example, a case will be described where in gate system 100, the person can desire the inspector to impress an immigration or emigration stamp to the passport after passing through the exit gate.

In the present example, gate system control device 10 further includes a stamp confirming part (not shown). The stamp confirming part confirms with the person whether he or she desires the impression of the immigration or emigration stamp to the passport after the authentication processing of the person using the passport. If the stamp confirming part confirms that the impression of the immigration or emigration stamp is desired, controller 13 further outputs a signal indicating that the impression of the immigration or emigration stamp is to be performed after the person exits from the exit gate. Controller 13 outputs this signal to a terminal used by the inspector staying near (around) the exit gate of gate system 100.

Figure 14:
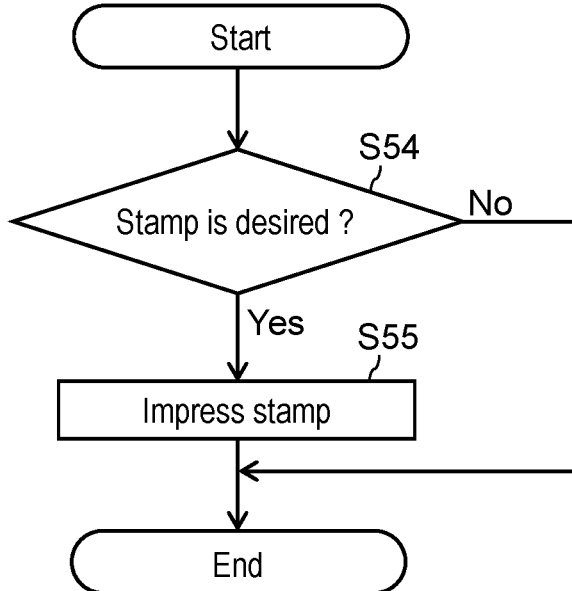
FIG. 14 is a flowchart showing operation of the gate system in a fifth example.

FIG. 14 is a flowchart showing operation of gate system 100 in a fifth example. The flowchart shown in FIG. 14 corresponds to one example of processing to be executed after the authentication processing (S13) shown in FIG. 9. The processing in the flowchart shown in FIG. 14 may be executed, for example, between the authentication processing (S13) and the exit time processing (S14), or may be executed after the exit time processing (S14).

In FIG. 9, suppose that the authentication processing by authentication part 14 has been completed. In this case, first, gate system 100 confirms with the person whether he or she desires the stamp (S54). Here, desiring the stamp means that the person desires the inspector to impress the dated immigration or emigration stamp to the passport. More specifically, controller 13 of gate system control device 10 may output a signal to confirm whether or not the stamp is desired after the authentication processing of the person using the passport by authentication part 14. In this case, a display at a position where the person can confirm displays a screen configured to confirm with the person whether or not he or she desires the stamp. This display may be included in gate system control device 10, or may be near the placement region.

In S54, if the person does not desire the stamp (No in S54), the processing for confirming whether he or she desires the stamp ends. Thereafter, the processing may advance to the next processing such as the exit time processing (S14) and the like shown in FIG. 9.

On the other hand, if the person desires the stamp in S54 (Yes in S54), the impression of the immigration or emigration stamp is performed after the person exits from the exit gate (S55). More specifically, if the person desires the stamp, gate system 100 outputs a signal, to the terminal used by the inspector staying around the exit gate, the signal indicating that the impression of the immigration or emigration stamp is to be performed after the person exits from the exit gate. This allows the inspector to impress the immigration or emigration stamp after the person exits from the exit gate.

In this manner, it is confirmed whether or not the stamp is desired after the authentication has been completed, by which the person can perform actions that are enabled by impression of the immigration or emigration stamp to the passport. Here, the actions that are enabled by the impression of the immigration or emigration stamp to the passport are shopping utilizing tax exemption, and the like.

Here, the example has been described in which gate system 100 outputs the signal indicating that the impression of the immigration or emigration stamp is to be performed to the terminal used by the inspector staying around the exit gate. However, the present disclosure is not limited thereto. Gate system 100 may have a mechanism configured to perform the impression of the immigration or emigration stamp. In this case, by automatically searching for vacant space in the passport, or by specifying a place where the person wants the stamp to be impressed, gate system 100 may perform the impression of the immigration or emigration stamp.

Sixth Example

In the present example, processing will be described, in which when the placing way of the passport sensed by first sensor 11 is not the horizontal placement, this situation is notified. In the following drawings, similar elements are given with the same reference marks, and detailed description is omitted.

Figure 15:
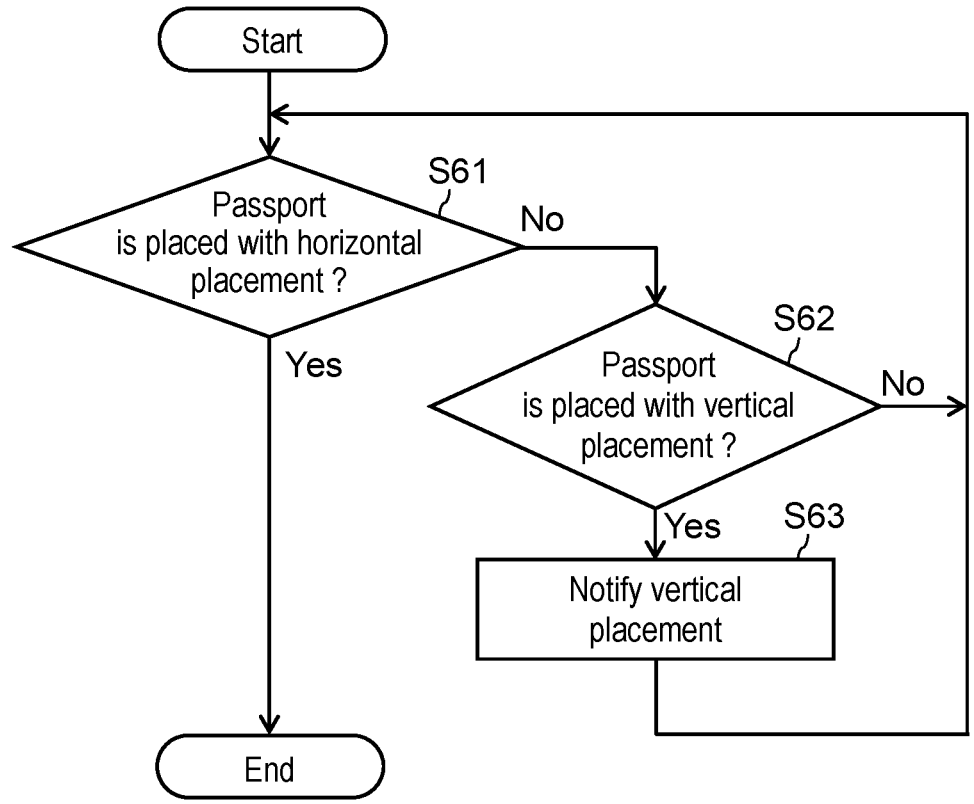
FIG. 15 is a flowchart showing operation when the first sensor senses a placing way of the passport in a sixth example.

FIG. 15 is a flowchart showing operation when first sensor 11 senses the placing way of the passport in a sixth example. The flowchart shown in FIG. 15 corresponds to one example of details of the placing way sensing processing (S11) shown in FIG. 9.

Namely, in the placing way sensing processing (S11) shown in FIG. 9, first, first sensor 11 senses whether the placing way of the passport on the placement region is the horizontal placement (S61). More specifically, placing way sensor 111 senses whether the placing way of the passport on the placement region is the horizontal placement, based on the image of the placement region captured by the image sensor. Placing way sensor 111 senses the horizontal placement or the like, using an image after processing, which is an image after subjecting the image of the placement region captured by the image sensor to binarization processing by a background subtraction technique or by an image level. Details of the sensing method will be described later.

In S61, if the placing way of the passport on the placement region is the horizontal placement (Yes in S61), the processing ends.

On the other hand, in S61, if the placing way of the passport on the placement region is not the horizontal placement (No in S61), first sensor 11 senses whether the placing way of the passport on the placement region is the vertical placement (S62). More specifically, placing way sensor 111 senses whether the placing way of the passport on the placement region is the vertical placement, based on the image of the placement region captured by the image sensor.

In S62, if the placing way of the passport on the placement region is the vertical placement (Yes in S62), first sensor 11 notifies that the placing way of the passport is the vertical placement (S63). The processing then returns to the processing in S61. More specifically, if placing way sensor 111 senses that the placing way of the passport on the placement region is the vertical placement, notification part 114 notifies the person that the placing way of the passport is the vertical placement. In S62, if the placing way of the passport is not the vertical placement (No in S62), the processing also returns to the processing S61.

While notification part 114 notifies the person that the placing way of the passport is the vertical placement, the present example is not limited thereto. Notification is performed so as to promote the placing way of the passport to change to the horizontal placement.

In this manner, if the placing way of the passport in the placement region is the vertical placement, first sensor 11 notifies that the placing way is wrong, or that the placing way should be properly changed to the horizontal placement. Namely, if the passport is not placed with the horizontal placement, controller 13 causes the gate system to execute the processing for notifying the person that the passport is not placed with the horizontal placement. Since this allows automatic inspection of the passport to start, time for the inspection can be shortened.

Hereinafter, a method for sensing the placing way of the passport on the placement region by placing way sensor 111 will be described.

Placing way sensor 111 senses a shape pattern formed of white pixels with which the placement region in the image after the processing is filled, which is the image after subjecting the image of the placement region captured by the image sensor to the background subtraction technique or the binarization processing by an image level. This may allow placing way sensor 111 to sense the placing way of the passport on the placement region. The background subtraction technique is a method in which a difference (an absolute value thereof) from a current input image is calculated, using a background image, and proper threshold processing is executed to extract an object captured in the input image. In the present example, an image of the placement region in a state where the passport is not placed corresponds to the background image, and an image of the placement region in a state where the passport is placed is the input image.

For example, by sensing a ratio of the white pixels with which the placement region in the image after the processing is filled, placing way sensor 111 may sense that the placing way of the passport on the placement region is the horizontal placement or other than the horizontal placement. Hereinafter, this will be described with reference to FIG. 16A to FIG. 17B.

Figure 16A:
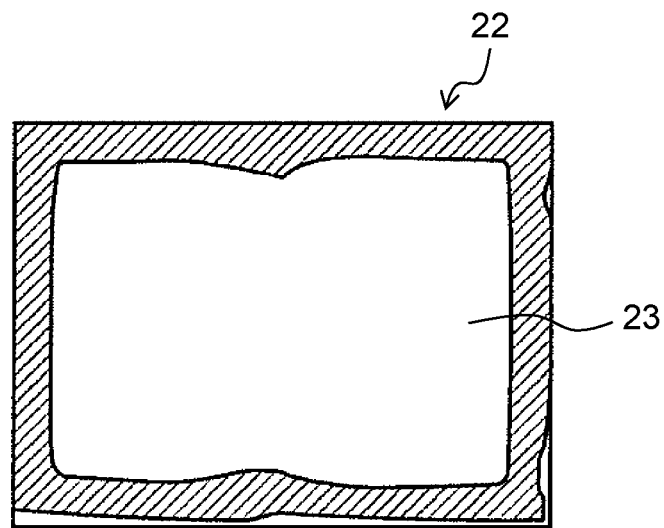
FIG. 16A is an explanatory view of one example of a method for sensing horizontal placement of the passport in the sixth example.
Figure 16B:
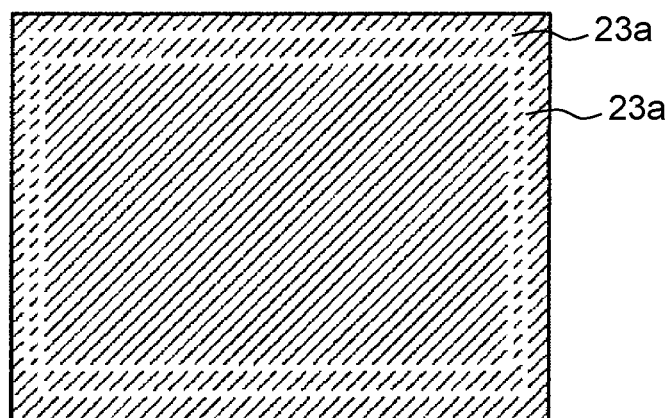
FIG. 16B is an explanatory view of one example of the method for sensing the horizontal placement of the passport in the sixth example.

FIG. 16A and FIG. 16B are explanatory views of one example of a method for sensing the horizontal placement of the passport in the sixth example. FIG. 16A shows the image after the processing, which is the image after subjecting the image of the placement region captured by the image sensor to the background subtraction technique or the binarization processing by the image level. Moreover, in the image after the processing shown in FIG. 16A, placement region 22 is shown, and region 23 (i.e., a region of the white pixels) is shown. Region 23 corresponds to a region of the passport when the passport in the opened state is placed on placement region 22.

Placing way sensor 111 moves frame 23a shown in FIG. 16B in placement region 22 of the image after the processing shown in FIG. 16A. Placing way sensor 111 searches for a position where frame 23a overlaps region 23 inside placement region 22. If at the position where frame 23a overlaps region 23 inside placement region 22, a filling rate (a ratio of the white pixels) of region 23 (i.e., the white pixels) inside frame 23a is a threshold or higher, it can be sensed that region 23 indicates that the passport is placed with the horizontal placement.

Figure 17A:
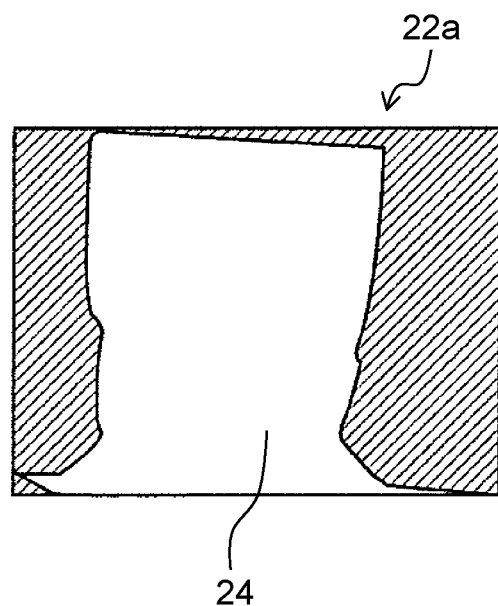
FIG. 17A is an explanatory view of one example of a method for sensing vertical placement of the passport in the sixth example.
Figure 17B:
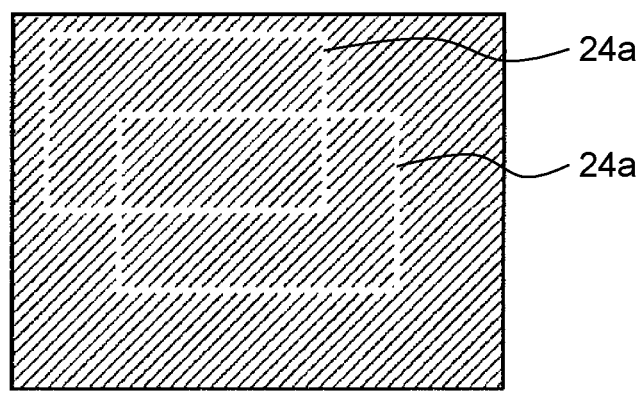
FIG. 17B is an explanatory view of one example of the method for sensing the vertical placement of the passport in the sixth example.

FIG. 17A and FIG. 17B are explanatory views of one example of a method for sensing the vertical placement of the passport in the sixth example. FIG. 17A shows an image after the processing, which is the image after subjecting the image of the placement region captured by the image sensor to the background subtraction technique or the binarization processing by the image level. In the image after the processing shown in FIG. 17A, placement region 22a and region 24 (i.e., a region of the white pixels) are shown. Region 24 corresponds to a region of the passport when the passport in the opened state is placed on placement region 22a.

Placing way sensor 111 moves frame 24a shown in FIG. 17B in placement region 22a of the image after the processing shown in FIG. 17A. Placing way sensor 111 searches for a position where frame 24a overlaps region 24 inside placement region 22a. If at the position where frame 24a overlaps region 24 inside placement region 22a, the filling rate (the ratio of the white pixels) of region 24 (i.e., the white pixels) inside frame 24a is a threshold or higher, it can be sensed that region 24 indicates that the passport is placed with the vertical placement.

Moreover, if placing way sensor 111 senses that a length of a longer side in the region formed by the white pixels filling an inside of the placement region in the image after the processing substantially corresponds to a length of a longer side of the passport in the opened state, placing way sensor 111 may sense that the placing way of the passport in the placement region is the horizontal placement. Hereinafter, this will be described with reference to FIG. 18 and FIG. 19.

Figure 18:
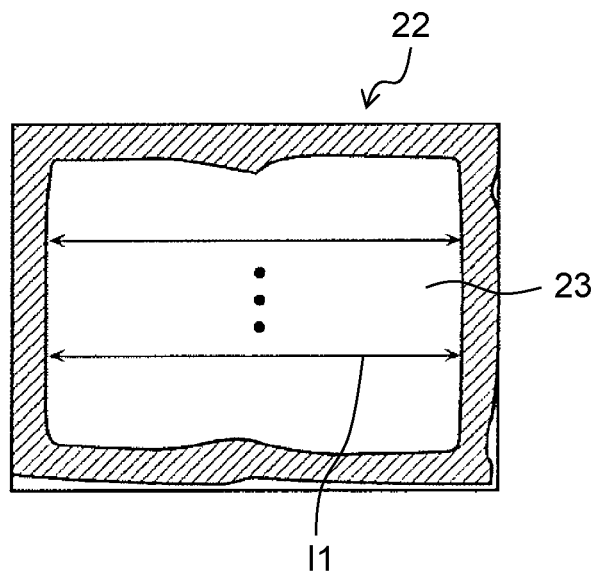
FIG. 18 is an explanatory view of another example of the method for sensing the horizontal placement of the passport in the sixth example.

FIG. 18 is an explanatory view of another example of the method for sensing the horizontal placement of the passport in the sixth example. In FIG. 18, placement region 22 and region 23 (i.e., the region of the white pixels) in the image after the processing shown in FIG. 16A are shown.

As shown in FIG. 18, if a continuous pixel length of the white pixels (length l1 of the longer side in region 23 in FIG. 18) filling the inside of placement region 22 in the image after the processing is a width of the passport when the passport is placed with the horizontal placement, placing way sensor 111 can sense that the passport is placed with the vertical placement. Here, the width when the passport is placed with the horizontal placement corresponds to the length of the longer side of the passport in the opened state.

Moreover, placing way sensor 111 may sense that the placing way of the passport in the placement region is other than the horizontal placement. Hereinafter, a case where the placing way of the passport is the diagonal placement will be described in FIG. 19.

Figure 19:
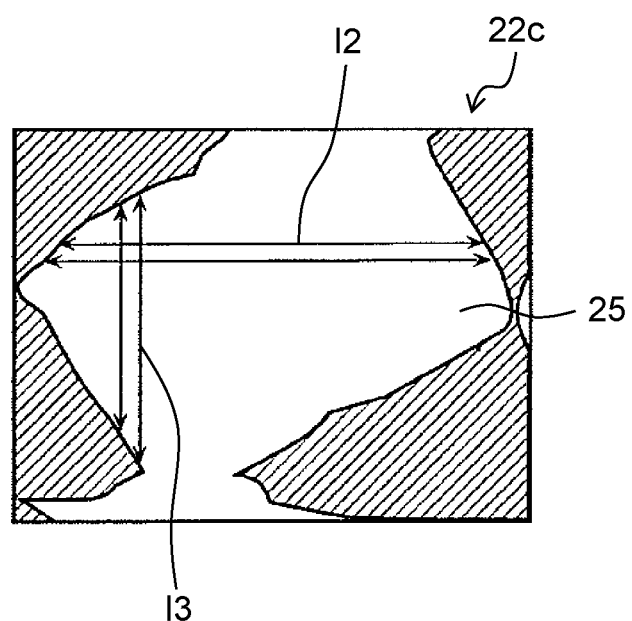
FIG. 19 is an explanatory view of one example of a method for sensing diagonal placement of the passport in the sixth example.

FIG. 19 is an explanatory view of one example of a method for sensing the diagonal placement of the passport in the sixth example. FIG. 19 shows an image after the processing, which is the image after subjecting the image of the placement region captured by the image sensor to the background subtraction technique or the binarization processing by the image level. In the image after the processing shown in FIG. 19, placement region 22c and region 25, that is, a region of the white pixels, are shown. Region 25 corresponds to a region of the passport when the passport in the opened state is placed in placement region 22c.

As shown in FIG. 19, placing way sensor 111 can sense that the passport is placed with the diagonal placement, based on length l2 of a horizontal line and length l3 of a vertical line of placement region 22c of the white pixels (region 25) filling an inside of placement region 22c in the image after the processing. Namely, this is because if lengths l2, l3 of the horizontal and vertical lines are not substantially constant along horizon and vertical directions of placement region 22c, but increase or decrease, placing way sensor 111 can determine that the passport is placed with the diagonal placement.

Moreover, by sensing a filling extent of black pixels around the placement region in the image after the processing, placing way sensor 111 may sense whether the placing way of the passport in the placement region is the horizontal placement or other than the horizontal placement. Hereinafter, this will be described with reference to FIG. 20A to FIG. 20C.

Figure 20A:
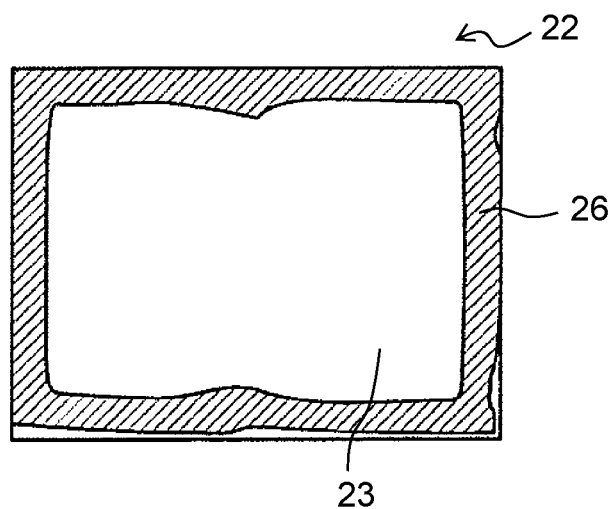
FIG. 20A is an explanatory view of another example of the method for sensing the placing way of the passport in the sixth example.
Figure 20B:
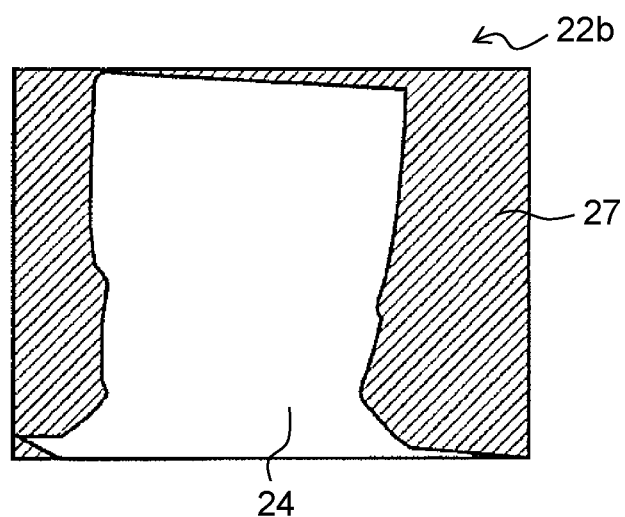
FIG. 20B is an explanatory view of the other example of the method for sensing the placing way of the passport in the sixth example.
Figure 20C:
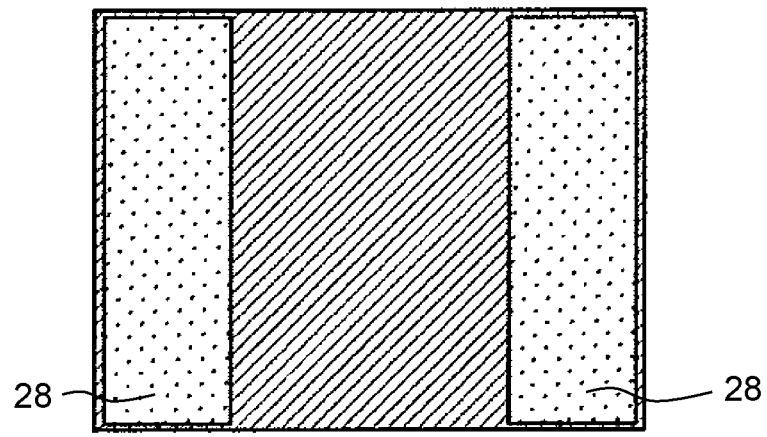
FIG. 20C is an explanatory view of the other example of the method for sensing the placing way of the passport in the sixth example.

FIG. 20A to FIG. 20C are explanatory views of another example of the method for sensing placing way of the passport in the sixth example.

FIG. 20A and FIG. 20B show an image after the processing, which is the image after subjecting the image of the placement region captured by the image sensor to the background subtraction technique or the binarization processing by the image level. In the image after the processing shown in FIG. 20A, placement region 22, region 23, and region 26, which is an area of the black pixels, are shown. In the image after the processing shown in FIG. 20B, placement region 22b, region 24, and region 27, which is a region of the black pixels, are shown.

Placing way sensor 111 can sense whether the placing way of the passport on the placement region is the horizontal placement or the vertical placement from the extent of the filling of the black pixels inside frame 28 when frames 28 at positions shown in FIG. 20C overlaps FIG. 20A and FIG. 20B. For example, if a filling rate (an area of region 26) of the black pixels overlapping frames 28 shown in FIG. 20C is smaller than a threshold in placement region 22 of the image after the processing shown in FIG. 20A, placing way sensor 111 can sense that the passport is placed with the horizontal placement. Moreover, for example, if the filling rate (an area of region 27) of the black pixels overlapping frames 28 shown in FIG. 20C is larger than a threshold in placement region 22b of the image after the processing shown in FIG. 20B, placing way sensor 111 can sense that the passport is placed with the vertical placement.

In this manner, placing way sensor 111 can sense the placing way of the passport on the placement region by sensing a filling state of a pattern that looks like the horizontal placement or the vertical placement, a filling state (a situation of the continuous pixel length) inside the passport, or a vacant state around the passport, using the image after the binarization processing by the background subtraction technique or by the image level.

It has been described that in S62 in FIG. 15, after sensing that the placing way of the passport on the placement region is the vertical placement, first sensor 11 notifies that the placing way of the passport is the vertical placement. However, the present disclosure is not limited thereto. After a predetermined time, which is a grace time for the person who is about to place the passport on the placement region to realize the wrong placing way for himself or herself, or to properly replace the passport with the horizontal placement, the notification indicating that the placing way of the passport is the vertical placement may be performed. Namely, when it is sensed continuously for a predetermined time by placing way sensor 111 that the placing way of the passport on the placement region is other than the horizontal placement, notification part 114 may notify the person that the placing way is other than the horizontal placement. Hereinafter, this will be described with reference to FIG. 21.

Figure 21:
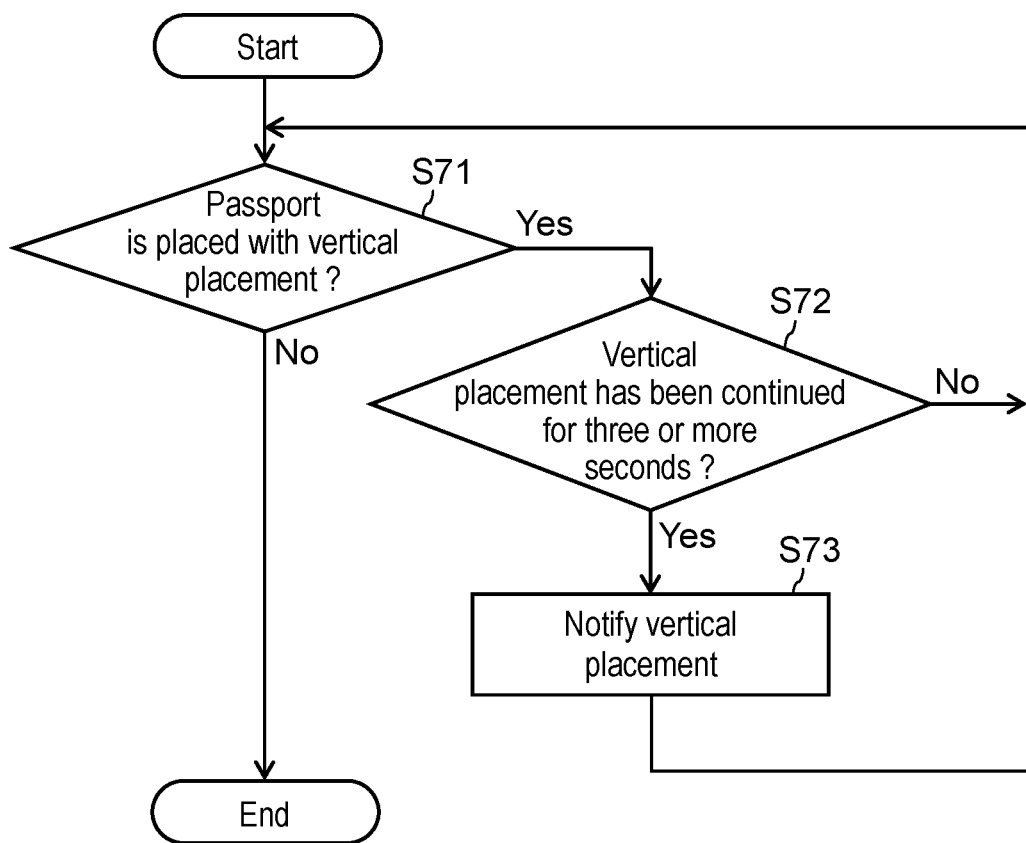
FIG. 21 is a flowchart showing operation when the first sensor senses the placing way of the passport in the sixth example.

FIG. 21 is a flowchart showing operation when first sensor 11 senses the placing way of the passport in the sixth example. The flowchart shown in FIG. 21 corresponds to one example of details of the placing way sensing processing (S11) shown in FIG. 9. Similar elements to those in FIG. 15 are given with the same reference marks, and detailed description is omitted.

Namely, in S71, if the placing way of the passport on the placement region is the vertical placement (Yes in S71), first sensor 11 senses whether the placing way of the passport on the placement region is the vertical placement continuously for three or more seconds (S72). More specifically, placing way sensor 111 senses whether the placing way of the passport on the placement region is the vertical placement continuously for three or more seconds, based on the image of the placement region captured by the image sensor. Here, three or more seconds is one example of the predetermined time, and the predetermined time is not limited thereto.

If the placing way of the passport on the placement region is the vertical placement continuously for three or more seconds (Yes in S72), first sensor 11 notifies that the placing way is the vertical placement (S73).

As described above, placing way sensor 111 may generate the image subjected to the binarization processing from the image of the placement region (the image after the processing). Placing way sensor 111 may sense whether or not the passport is placed with the horizontal placement, using the image subjected to the binarization processing.

Moreover, using the image subjected to the binarization processing, placing way sensor 111 may sense a first region (region 23), which is a region corresponding to the passport, or a second region (region 26), which is a region other than the region corresponding to the passport in the placement region. Placing way sensor 111 may sense whether or not the passport is placed with the horizontal placement, based on the first region or the second region.

Moreover, placing way sensor 111 may sense whether or not the passport is placed with the horizontal placement, based on a ratio between an area of a predetermined region (frame 23a) and an area of the first region (region 23). Alternatively, placing way sensor 111 may sense whether or not the passport is placed with the horizontal placement, based on a ratio between an area of a predetermined region (frames 28) and an area of the second region (region 26).

Seventh Example

In the present example, a case will be described, where in first sensor 11, the placing way of the passport on the placement region is sensed by the image sensor without turning on the internal light source. Here, the placement region is made of a transparent glass surface, and the passport is placed on the glass surface. Moreover, a description will be given on the premise that the image sensor captures an image of the glass surface (i.e., the placement region) from below the glass surface, and that the internal light source is installed below the glass surface.

Figure 22:
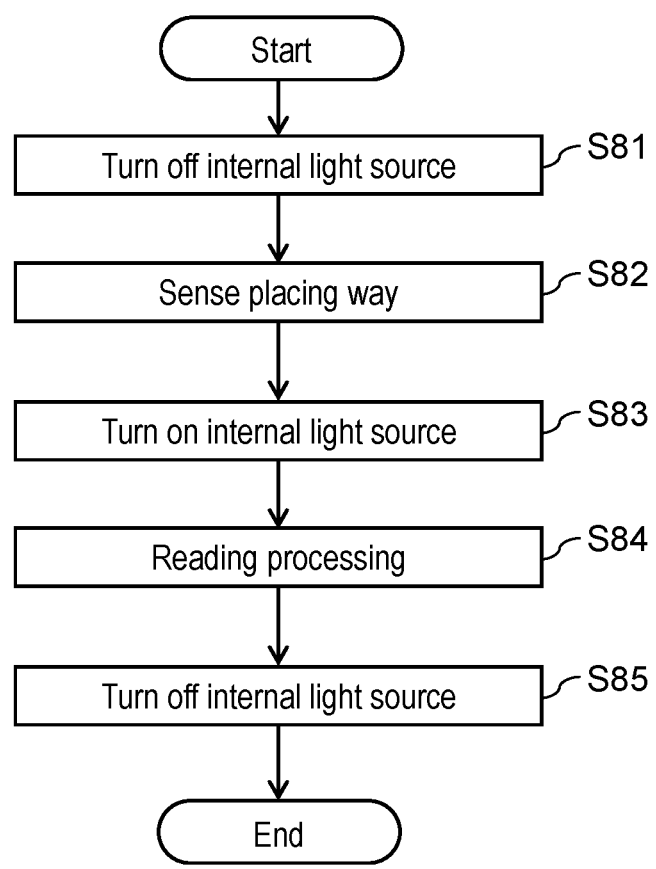
FIG. 22 is a flowchart showing operation of the first sensor in a seventh example.

FIG. 22 is a flowchart showing operation of first sensor 11 in a seventh example. FIG. 22 corresponds to one example of the processing before the authentication processing shown in FIG. 9.

Namely, in S10 shown in FIG. 9, suppose that the person enters the region inside gate system 100 from the entrance gate. In this case, first, first sensor 11 turns off the internal light source (S81).

Next, first sensor 11 senses the placing way of the passport on the placement region with the internal light source turned off (S82). The processing in S82 corresponds to the placing way sensing processing shown in FIG. 9. Details are as described above, and thus, description here is omitted.

Next, first sensor 11 turns on the internal light source (S83). First sensor 11 reads the information indicated in the passport, based on the image of the passport captured by the image sensor (S84). The processing in S84 corresponds to the reading processing shown in FIG. 9.

When the reading processing in S84 ends, first sensor 11 turns off the internal light source (S85).

In this manner, in the present example, the internal light source is not lighted before the person places the passport on the placement region to thereby cover the glass surface in the placement region. This can prevent the person from feeling dazzled when the person places the passport on the placement region.

Eighth Example

In the present example, acquisition timing of the background image will be described. The background image is used when the processing by the background subtraction technique is executed to an image of the placement region. In the present example, an image of the placement region in the state where the passport is not placed corresponds to the background image, and an image of the placement region in the state where the passport is placed corresponds to the input image. In the following drawings, similar elements are given with the same reference marks, and detailed description is omitted.

Figure 23:
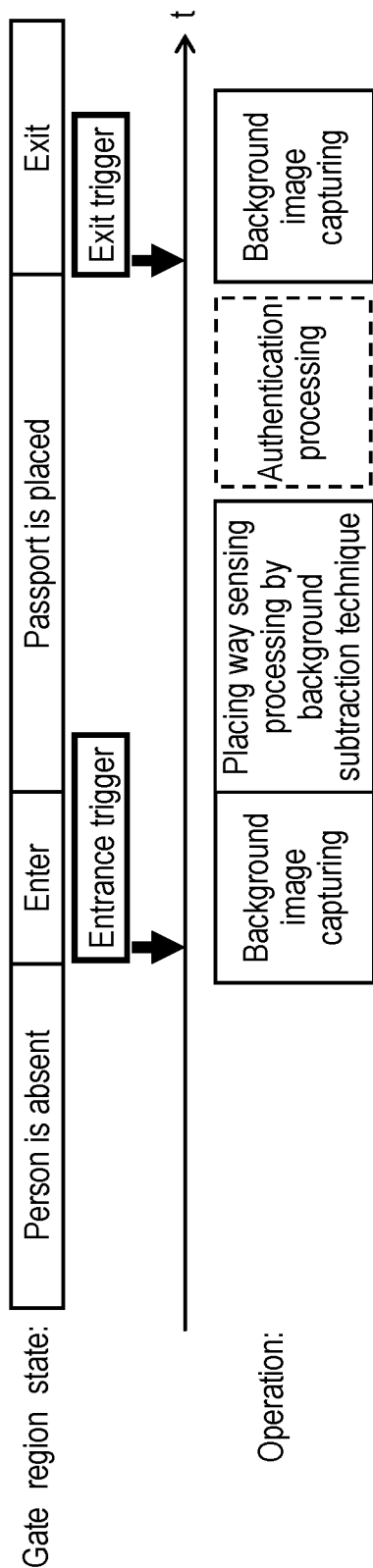
FIG. 23 is an explanatory diagram of one example of acquisition timing of a background image in an eighth example.

FIG. 23 is an explanatory diagram of one example of the acquisition timing of the background image in an eighth example. In FIG. 23, a gate region state means a state of the region inside gate system 100. In FIG. 23, operation means operation of first sensor 11. In the example shown in FIG. 23, first sensor 11 captures (acquires) the background image in accordance with an entrance trigger or an exit trigger when the person exits from the region inside gate system 100. Here, the entrance trigger is a time when the person enters the region inside gate system 100, and timing before the passport is placed on the placement region. Moreover, the entrance trigger is timing when gate system control device 10 outputs, to the entrance gate controller, the signal to open the entrance gate such that the person passes through the entrance gate. Moreover, the entrance trigger may be timing when the human detecting sensor configured to sense that a person enters the gate system senses the person. Moreover, the exit trigger is, for example, timing when gate system control device 10 outputs, to exit gate controller 19, the signal to open the exit gate such that the person passes through the exit gate.

In other words, if placing way sensor 111 executes the processing by the background subtraction technique, first sensor 11 only needs to acquire, as the background image, the image of the placement region in the state where the passport is not placed when no person is present in a region between the entrance gate and the exit gate.

In this manner, placing way sensor 111 uses, as the background image, the image of the placement region in the state where the passport is not placed in the background subtraction technique. That is, by acquiring the background image when the person enters or exits, first sensor 11 can surely acquire the background image, which is the image of the placement region in the state where the passport is not paced when no person is present in the region inside gate system 100. This prevents the acquisition of the background image from failing, so that first sensor 11 can stably execute the processing by the background subtraction technique.

Figure 24:
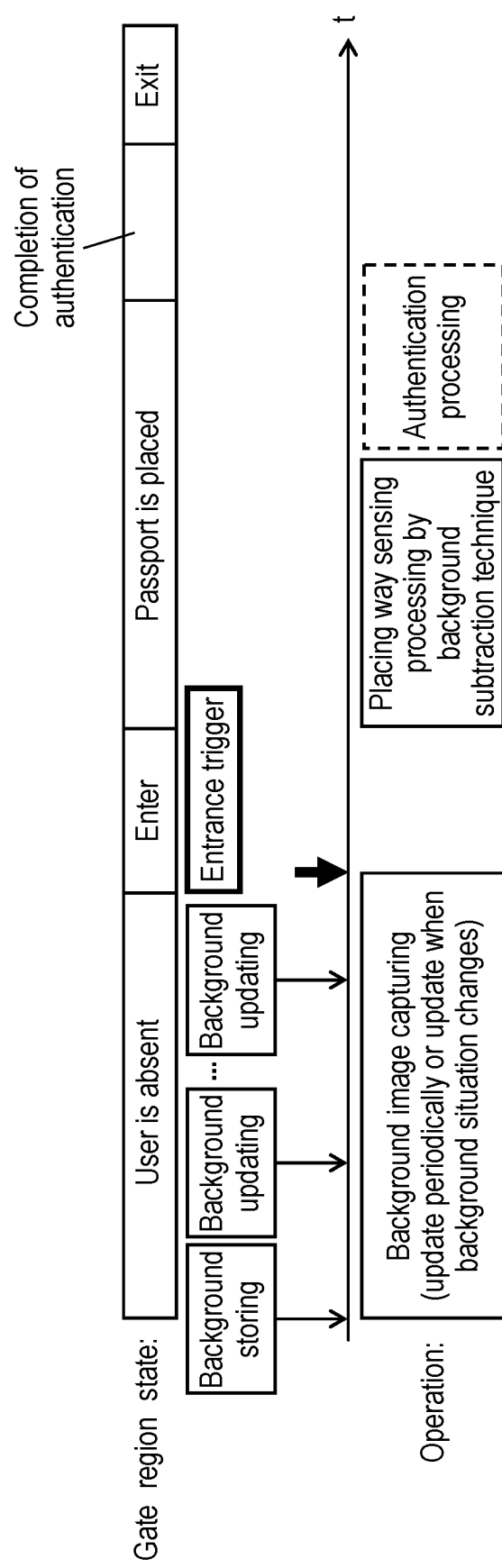
FIG. 24 is an explanatory diagram of one example of the acquisition timing of the background image in the eighth example.

FIG. 24 is an explanatory diagram of one example of the acquisition timing of the background image in the eighth example. In the example shown in FIG. 24, first sensor 11 captures (acquires) the background image before the person enters the region inside gate system 100 (in the state where the person is absent). First sensor 11 may periodically capture the background image in the state where the person is absent, and update the background image held in the memory (not shown) or the like. Moreover, while first sensor 11 may periodically capture the background image in the state where the person is absent, first sensor 11 may update the background image held in the memory (not shown) or the like only when a background situation changes. The case where the background situation changes may be, for example, a case where the environmental illuminance, which is the illuminance around the installation place of the image sensor, has changed.

In this manner, by acquiring the background image when the person is absent, first sensor 11 can surely acquire the background image, which is the image of the placement region in the state where the passport is not placed.

The background image is not limited to the above-described image captured at the acquisition timing. If the capturing of the background image fails, a last background image, the capturing of which has succeeded, may be used. This will be described with reference to FIG. 25 and FIG. 26.

Figure 25:
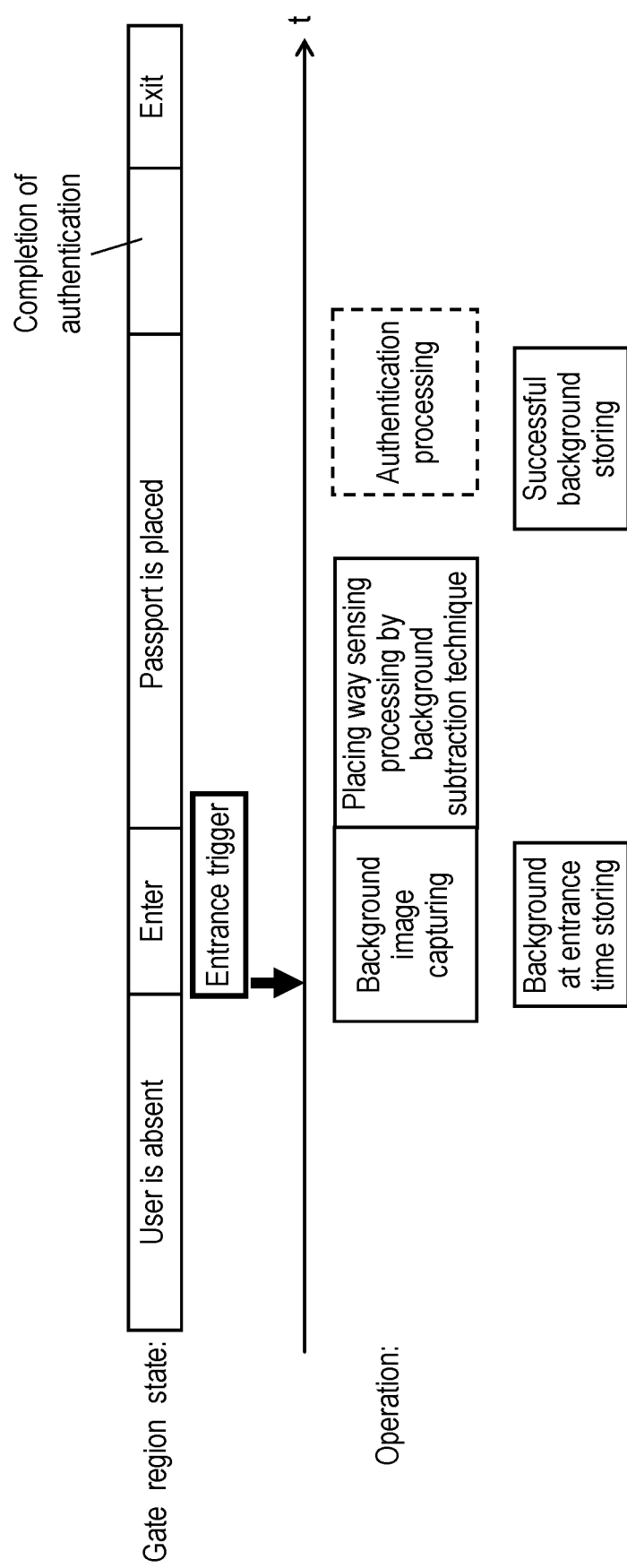
FIG. 25 is an explanatory diagram of one example of the acquisition timing of the background image in the eighth example.
Figure 26:
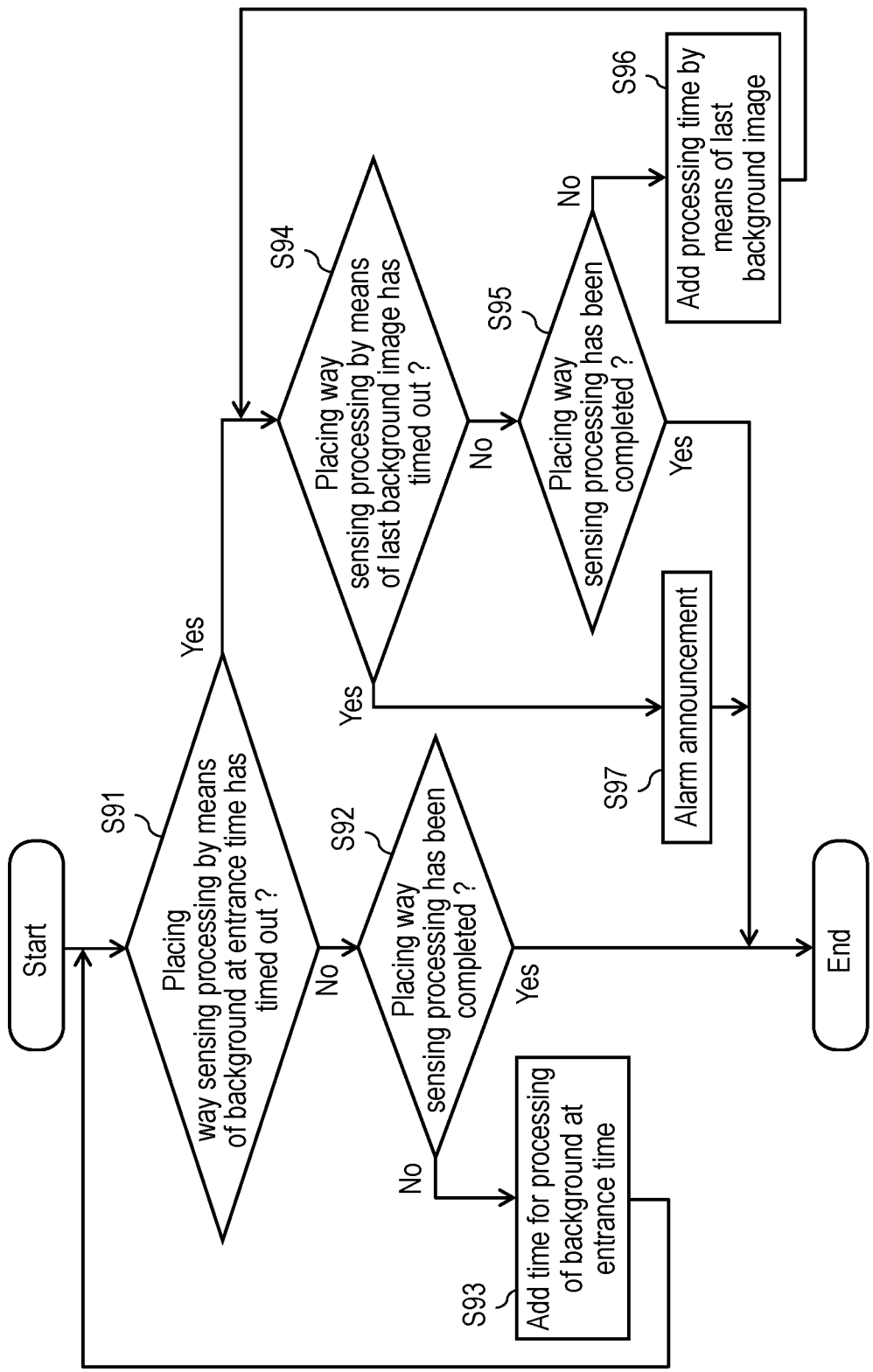
FIG. 26 is a flowchart showing one example of operation of the first sensor in the eighth example.

FIG. 25 is an explanatory diagram of one example of the acquisition timing of the background image in the eighth example. FIG. 26 is a flowchart showing one example of operation of first sensor 11 in the eighth example.

First, as shown in FIG. 25, first sensor 11 acquires (captures) the background image (hereinafter, referred to as background at the entrance time or a current background image as well) in accordance with the entrance trigger. In this case, first sensor 11 determines whether or not the placing way sensing processing by means of the acquired background at the entrance time has timed out (S91). Here, the timeout means a case where a preset time has been exceeded.

In S91, if the placing way sensing processing by means of the background at the entrance time has not timed out (No in S91), first sensor 11 confirms whether the placing way sensing processing has been completed (S92). If the placing way sensing processing has been completed (Yes in S92), as shown in FIG. 25, the background at the entrance time is stored as a successful background image (hereinafter, referred to as a last background image as well), and the processing is ended. In S92, if the placing way sensing processing has not been completed (No in S92), a time required for the placing way sensing processing, using the background at the entrance time (a time for the processing of the background at the entrance time) is added (S93). The processing then returns to the processing in S91. The time for the processing of the background at the entrance time added in S93 is used in the processing in S91. The time for the processing of the background at the entrance time is, for example, about three seconds to five seconds.

On the other hand, in S91, if the placing way sensing processing by means of the background at the entrance time has timed out (Yes in S91), first sensor 11 shifts to placing way sensing processing by means of the last background image stored in the last processing. First sensor 11 then determines whether or not the placing way sensing processing by means of the last background image has timed out (S94).

In S94, if the placing way sensing processing by means of the last background image has not timed out (No in S94), first sensor 11 confirms whether the placing way sensing processing by means of the last background image has been completed (S95). If the placing way sensing processing by means of the last background image has been completed (Yes in S95), as shown in FIG. 25, the last background image is stored as a successful background image, and the processing is ended. If the placing way sensing processing by means of the last background image has not been completed (No in S95), a time required for the placing way sensing processing by means of the last background image (a processing time using the last background image) is added (S96). The processing then returns to the processing in S94.

On the other hand, in S94, if the placing way sensing processing by means of the last background image has timed out (Yes in S94), the placing way sensing processing is disabled. Therefore, first sensor 11 announces (notifies) the situation to a person in charge of gate system 100 by alarm (S97).

In this manner, if the placing way sensing processing using the current background image has failed, first sensor 11 uses the last background image, which has succeeded in the last placing way sensing processing. This allows first sensor 11 to stably execute the processing by the background subtraction technique.

Ninth Example

In the present example, an example of a case where image determiner 113 of first sensor 11 determines the situation of the installation place of the image sensor will be described. In the following drawings, similar elements are given with the same reference marks, and detailed description is omitted. In the present example, the placement region is also made of a transparent glass surface, and the passport is also placed on the glass surface. Moreover, a description will be given on the premise that the image sensor captures an image of the glass surface, that is, the placement region from below the glass surface, and there is no cover for avoiding ambient light in the placement region.

Figure 27:
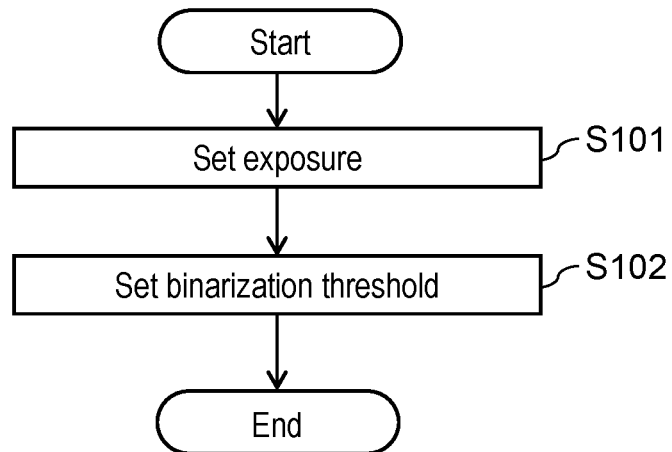
FIG. 27 is a flowchart showing operation when the first sensor adjusts setting of an image sensor in a ninth example.
Figure 28:
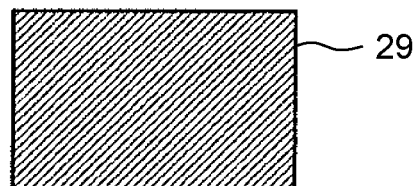
FIG. 28 is an explanatory view of one example of an image obtained by imaging a placement region in the ninth example.
Figure 29:
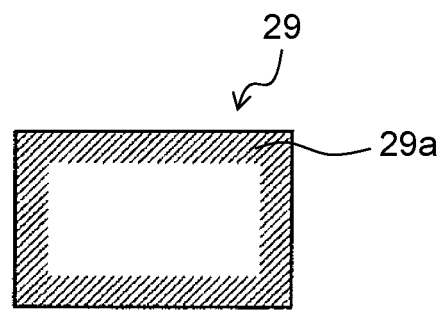
FIG. 29 is an explanatory view of one example of the image obtained by imaging the placement region in the ninth example.

FIG. 27 is a flowchart showing operation when first sensor 11 adjusts setting of the image sensor in a ninth example. FIG. 28 and FIG. 29 are explanatory views of one example of an image obtained by imaging the placement region in the ninth example. FIG. 28 shows image 29 obtained by imaging the placement region, which is the whole glass surface. FIG. 29 shows peripheral region 29a corresponding to a peripheral region of the placement region in image 29 obtained by imaging the placement region, which is the whole glass surface. Peripheral region 29a corresponds to an area where the passport comes into contact with the placement region, which is the glass surface, when the passport is placed.

First, first sensor 11 sets exposure of the image sensor at the installation time, at the starting time, or at the time of environmental illuminance change of the image sensor (S101). Next, first sensor 11 sets a binarization threshold for sensing the passport in the image obtained by imaging the placing region by the image sensor (S102).

More specifically, in S101, image determiner 113 determines the situation of the installation place of the image sensor. First sensor 11 sets the exposure of the image sensor in accordance with the situation determined by image determiner 113. Here, the above-mentioned situation may be environmental illuminance, which is illuminance of a periphery of the installation place of the image sensor, or may be a situation of a dark portion and a light portion of the image obtained by imaging the placement region. Moreover, for example, the situation may be a ratio between maximum luminance and minimum luminance of all pixels configuring image 29 as shown in FIG. 28. Moreover, the situation may be an average, a variance, or a standard deviation of the luminance of all the pixels configuring image 29 shown in FIG. 28. As described above, controller 13 may adjust the exposure of the image sensor, based on the background image. Specifically, controller 13 may adjust the exposure of the image sensor, based on the ratio between the maximum luminance and the minimum luminance of the pixels included in the background image.

Moreover, if first sensor 11 changes the exposure of the image sensor, image determiner 113 may determine a change amount (a rate of change) of average luminance of image 29 of the placement region captured by the image sensor. In this case, first sensor 11 may set, as the exposure of the image sensor, the exposure when the change amount corresponds to a predetermined value. While image determiner 113 determines the above-described situation, using all the pixels configuring image 29 shown in FIG. 28, the present example is not limited thereto. Image determiner 113 may determine the above-described situation, using pixels configuring peripheral region 29a shown in FIG. 29.

Next, processing in S102 will be specifically described.

Figure 30A:
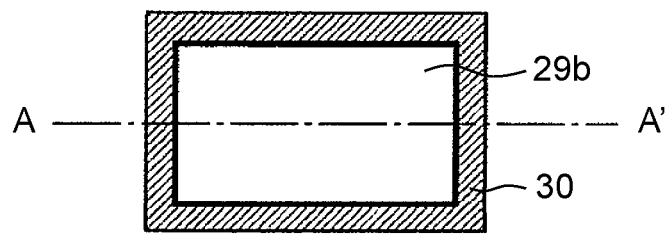
FIG. 30A is an explanatory view of a range that an image sensor images in the ninth example.
Figure 30B:
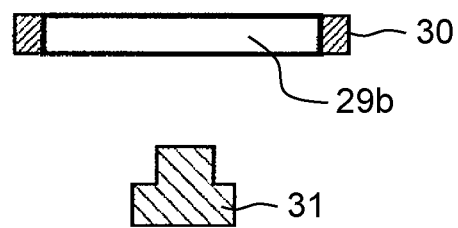
FIG. 30B is an explanatory view of the range that the image sensor images in the ninth example.

FIG. 30A and FIG. 30B are explanatory views of a range that the image sensor images in the ninth example. FIG. 30A and FIG. 30B show placement region 29b and outside region 30 of placement region 29b in the ninth example. FIG. 30B corresponds to a view when FIG. 30A is cut along line A-A' and is viewed from a side. Moreover, image sensor 31 is shown in FIG. 30B.

In S102, first sensor 11 causes image sensor 31 to image a range including placement region 29b and outside region 30 of the same. First sensor 11 sets the binarization threshold from a luminance average of pixels configuring a region corresponding to outside region 30 in a captured image. Here, since outside region 30 is hardly affected by light from outside, luminance of outside region 30 is close to luminance indicated by the image of the passport placed on placement region 29b. This is because outside region 30 is used.

A case can also be considered where in an image in the state where the passport is absent, which is captured by image sensor 31 in S102, a ratio of pixels each having luminance smaller than a threshold may exceed a predetermined value of about 30% to 50%. In this case, there is a possibility that in the image in the state where the passport is absent, first sensor 11 erroneously senses that the passport is placed. Therefore, first sensor 11 may return to S101 to make the exposure setting of image sensor 31 again, or may notify that the exposure setting of image sensor 31 is improper.

In this manner, after adjusting the exposure of the image sensor, first sensor 11 calculates the threshold used to sense that the passport is placed on the placement region, based on a luminance average of the pixels included in the outside region included in the image captured by the image sensor.

As described above, according to the present example, first sensor 11 can adjust the exposure and the like of the image sensor, based on the situation such as the environmental illuminance at the installation time, at the starting time, or at the time of environmental illuminance change. This allows first sensor 11 to optimally execute the placing way sensing processing under various environments.

Tenth Example

In the present example, a specific example of processing in which reader 112 reads the information indicated in the passport will be described.

Figure 31:
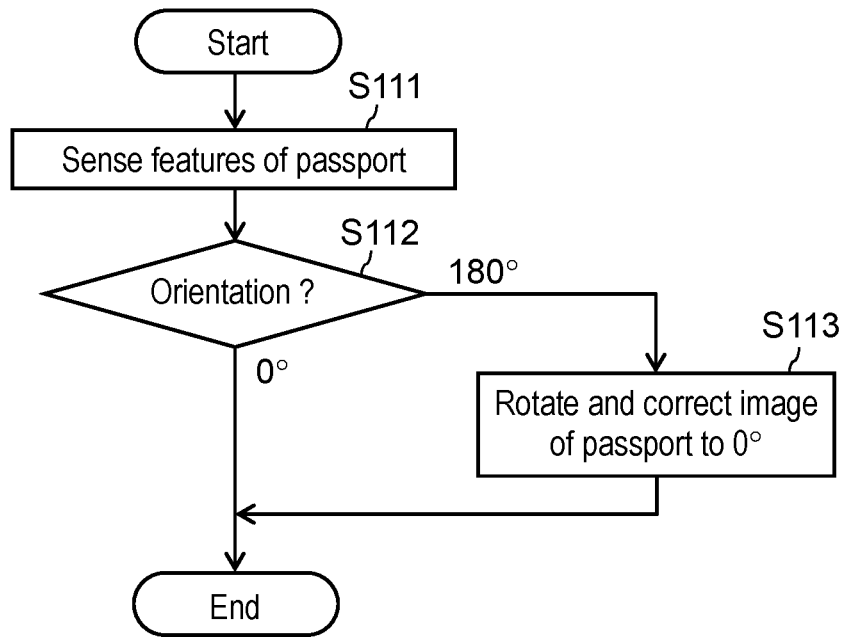
FIG. 31 is a flowchart showing operation of a reader in a tenth example.

FIG. 31 is a flowchart showing operation of reader 112 in a tenth example. The flowchart shown in FIG. 31 corresponds to a detailed example of the reading processing (S12) shown in FIG. 9.

Figure 32:
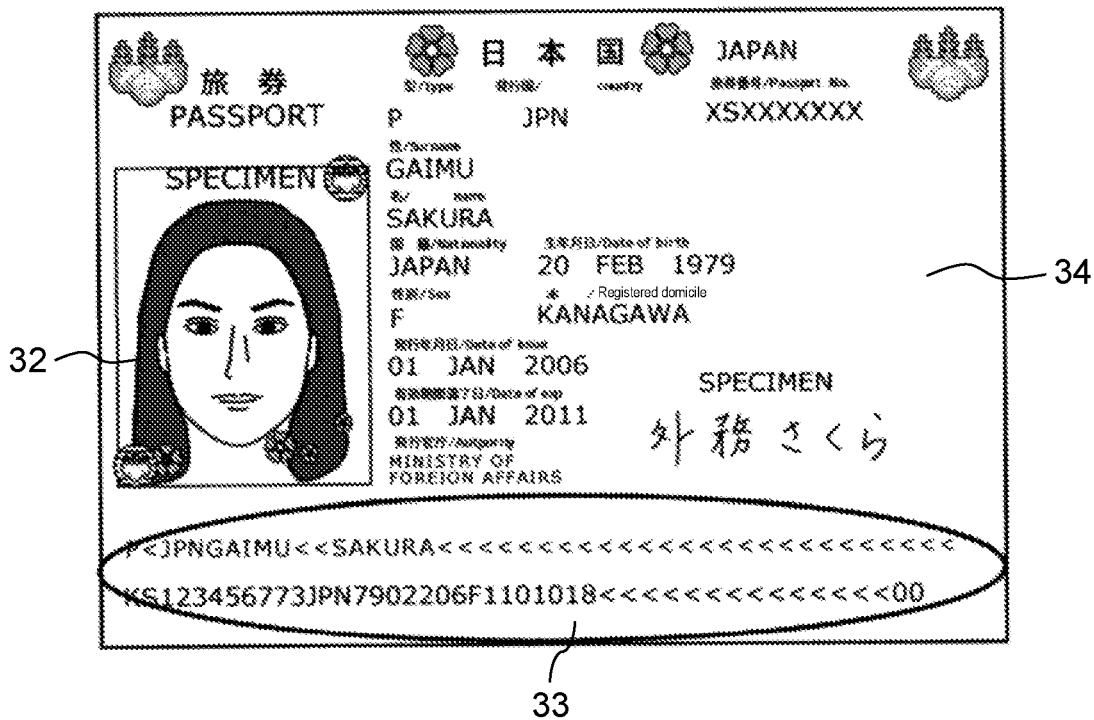
FIG. 32 is an explanatory view of characteristics peculiar to the passport in the tenth example.
Figure 33:
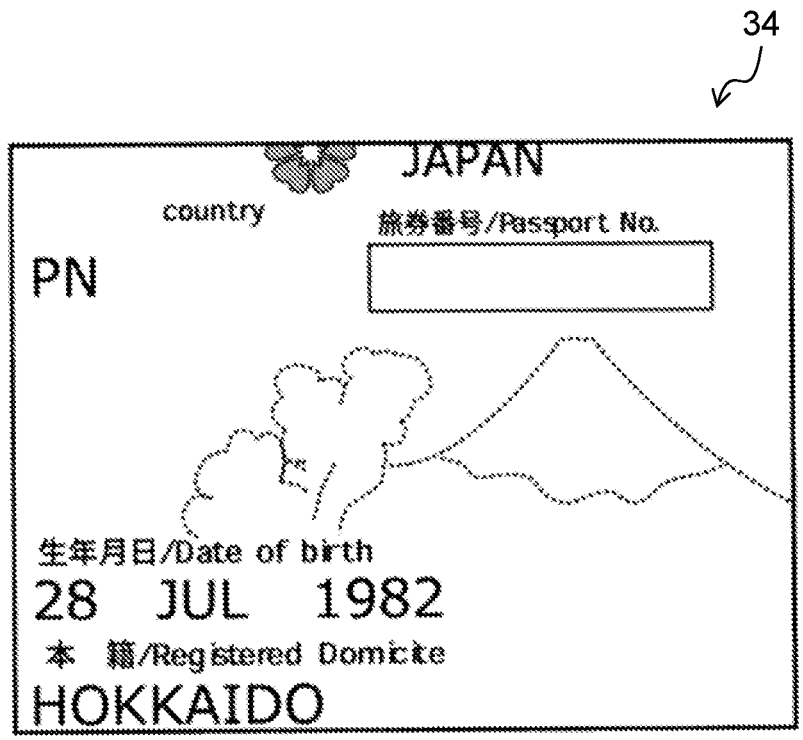
FIG. 33 is an explanatory view of the characteristics peculiar to the passport in the tenth example.

Namely, in the placing way sensing processing (S11) in FIG. 9, suppose that the placing way sensing processing has been completed by placing way sensor 111, and that the image sensor has captured the image of the passport placed on the placement region. In this case, first, reader 112 senses the features peculiar to the passport captured in the image of the passport (S111). Here, the features peculiar to the passport will be described. FIG. 32 and FIG. 33 are explanatory views of the features peculiar to the passport in the tenth example. Namely, as shown in FIG. 32 and FIG. 33, the passport includes face photograph 32 of the person who holds the passport, MRZ 33, hologram 34 of Mt. Fuji or cherry blossom, and a page number (not shown) at predetermined positions. Accordingly, these are the features peculiar to the passport. Namely, the features peculiar to the passport that reader 112 uses may be MRZ 33 of the passport, or may be face photograph 32 of the passport, or the position of hologram 34 in the passport. Moreover, the features peculiar to the passport may be an orientation of the page number of the passport, or may be an orientation of the person captured in the photograph or letters of the passport.

Next, reader 112 determines an orientation of the passport, based on the features peculiar to the passport captured in the image of the passport (S112). In S112, if the orientation of the passport is rotated by 180°, that is, the passport is inverted (180° in S112), the image of the passport is rotated and corrected to 0°. On the other hand, in S112, if the orientation of the passport is 0°, that is, the passport is not inverted (0° in S112), the processing ends without performing the correction. Thereafter, reader 112 reads the information indicated in the passport captured in the image of the passport.

As described above, in the present example, reader 112 determines whether or not the orientation of the passport is inverted with respect to a reading direction, based on the features peculiar to the passport captured in the image of the passport, and if the orientation of the passport is inverted, the image of the placement region is rotated by 180° to read the information indicated in the passport. The information indicated in the passport is, for example, the photograph, as described above. The read information indicated in the passport is sent to the person in charge such as the inspector staying near the exit gate, and is used to confirm the person who passes through the exit gate.

Reader 112 may read the information indicated in the passport from the image captured by image sensor 31 of the reading device shown in FIG. 3. Moreover, reader 112 may read the information indicated in the passport from the information that IC reader part 15 of authentication part 14 shown in FIG. 6 acquires.

As described above, according to the present example, the person who places the passport on the placement region can place the passport without worrying about a right-left orientation of the passport in the opened state, when horizontally placing the passport in the opened state on the placement region. This can reduce burden of the person who places the passport in the placement region.

Eleventh Example

In the above-described first to tenth examples, the case has been described, where if the passport in the opened state is placed horizontally on the placement region, it is sensed that the passport is placed on the placement region. However, the present disclosure is not limited thereto. If the placement region has an area equal to or more than a region that the passport in the opened state can be placed with the vertical placement, the placement of the passport on the placement region may be sensed, even when the passport in the opened state is placed with the vertical placement on the placement region. Namely, even if the orientation of the passport is vertical, based on the features peculiar to the passport captured in the image, reader 112 may read the information indicated in the passport, based on the image rotated by 90°. Hereinafter, this case will be described.

Figure 34:
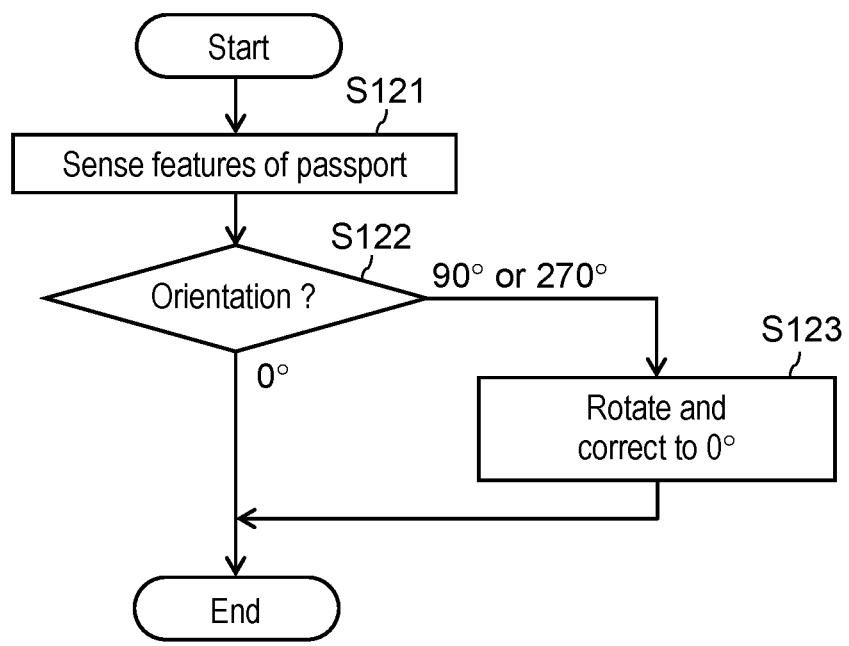
FIG. 34 is a flowchart showing operation of the reader in an eleventh example.

FIG. 34 is a flowchart showing operation of reader 112 in an eleventh example. The flowchart shown in FIG. 34 corresponds to a detailed example of the reading processing (S12) shown in FIG. 9.

Namely, in the placing way sensing processing (S11) shown in FIG. 9, suppose that in the case where the passport in the opened state is placed with the vertical placement on the placement region, the placing way sensing processing has been completed by placing way sensor 111, and that the image sensor has captured the image of the passport placed on the placement region. In this case, first, reader 112 senses the features peculiar to the passport captured in the image of the passport (S121). Details have been described in the tenth example, and thus, description thereof is omitted.

Next, reader 112 determines the orientation of the passport, based on the features peculiar to the passport captured in the image of the passport (S122). In S122, in the case of a vertical placement state where the orientation of the passport is other than 0°, that is, is rotated by 90° or by 270° (90°, 270° in S122), the image of the passport is rotated and corrected to 0° (S123). On the other hand, in S122, if the orientation of the passport is 0°, that is, is not inverted (0° in S122), the processing ends without performing the correction. Thereafter, reader 112 reads the information indicated in the passport captured in the image of the passport.

As described above, in the present example, in the case of the vertical placement state where the orientation of the passport is rotated by 90° or by 270°, based on the features peculiar to the passport captured in the image of the passport, reader 112 rotates and corrects the image of the passport to 0° to read the information indicated in the passport.

In this manner, according to the present example, the person who places the passport on the placement region needs not place the passport with the vertical placement or with the horizontal placement when placing the passport on the placement region in the opened state. Namely, the person can place the passport without worrying about the orientation. This can reduce burden of the person who places the passport on the placement region.

Twelfth Example

In the present example, a case will be described where a person other than the object person, who cannot use gate system 100, is determined by means of the information indicated in the passport, and notification or guidance is performed. Hereinafter, a description will be given on the premise that the object person who can use gate system 100 is a person having a predetermined nationality such as Japanese and the like, or a person of a predetermined age or older such as twelve or older and the like.

Figure 35:
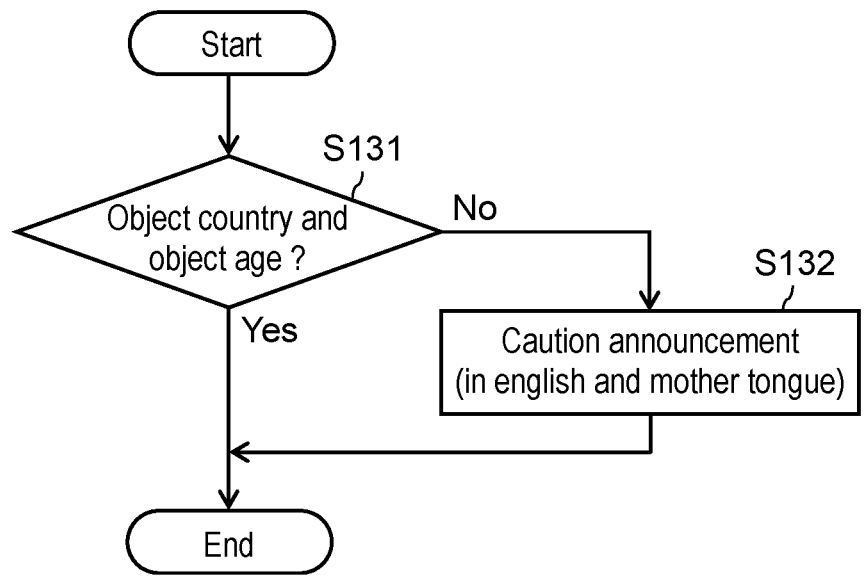
FIG. 35 is a flowchart showing operation of the first sensor in a twelfth example.

FIG. 35 is a flowchart showing operation of first sensor 11 in a twelfth example. The flowchart shown in FIG. 35 corresponds to an example of the processing after the reading processing (S12) shown in FIG. 9.

Namely, suppose that in FIG. 9, reader 112 executes the reading processing for reading the information indicated in the passport. In the present example, reader 112 reads the MRZ as the information indicated in the passport.

First, reader 112 determines whether the nationality or the age of the person who holds the passport is an object country or an object age that can use gate system 100, based on the MRZ (S131).

In S131, if the nationality or the age of the person who holds the passport is not the object country or the object age (No in S131), first sensor 11 announces (notifies) this to the person. If the nationality of the person who holds the passport is other than Japan, announcement may be performed in English or in a mother tongue determined by reading the MRZ. While this announcement is performed by notification part 114, voice announcement part 21 may perform this.

As described above, in the present example, if the person is not the object person who can use gate system 100, based on the information read by reader 112, first sensor 11 causes notification part 114 to notify the person that he or she is not the object person. More specifically, reader 112 may determine whether or not the person is the object person who can use gate system 100, based on the information of the MRZ of the passport. Notification part 114 notifies the person who is determined not to be the object person who can use gate system 100 by reader 112. Here, if the person is a foreigner, and is not the object person who can use gate system 100, notification part 114 may notify the fact in a mother tongue of the person. Namely, if the person is not the object person who can use the gate system, controller 13 causes the gate system to execute the processing for notifying the person that the person is not the object person. Here, reader 112 may acquire information of a language that the person uses from the information indicated in the passport. Controller 13 may cause the gate system to execute the processing for notifying that the person is not the object person in the language that the person uses.

Thereby, gate system control device 10 can determine the person who cannot use gate system 100 configured to perform automatic inspection, and quickly guide the person to an appropriate section in a language easy to understand. This allows only the person who can use gate system 100 to use gate system 100, so that smooth system operation can be performed.

Effects and the Like

According to the present disclosure, there can be provided a gate system control device or the like that can prevent a passport from being mislaid.

More specifically, gate system control device 1 of the present disclosure is a gate system control device configured to control gate system 100 having the exit gate, and includes first sensor 2, second sensor 3, and controller 4. First sensor 2 senses that the passport of the person who is in gate system 100 is placed on the placement region. Second sensor 3 senses that the person is moving. Controller 4 controls gate system 100. When first sensor 2 senses that the passport is placed on the placement region and second sensor 3 senses that the person is moving to the exit gate, controller 4 causes gate system 100 to execute the processing for notifying the person.

Here, for example, controller 4 may cause gate system 100 to execute the processing for closing the exit gate as the processing for notifying the person.

Here, for example, first sensor 2 may sense that the passport is placed on the placement region, based on the image of the placement region where the passport is placed, which image is captured by the image sensor.

Possibility of Other Exemplary Embodiments

Moreover, in the present disclosure, the image sensor images the glass surface, that is, the placement region from below the glass surface, as shown in FIG. 3. However, a surface where the information is described may not face a surface of the placement region, but both surfaces may face in opposite directions to each other. The configuration may be such that the image sensor images the glass surface, that is, the placement region from above the glass surface to perform the authentication. Namely, the image sensor may be disposed so as to image the information of the passport.

For example, the gate system may include a camera such as the image sensor outside the gate system control device or the like to image the placement region from above the placement region. In this case, a cover of the passport in the opened state and the orientation thereof can be determined by using the image in the state where the passport is placed on the placement region. This allows the gate system control device to perform caution announcement if a cover side of the passport is placed on the placement region. Hereinafter, this case will be described with reference to a drawing as a modification.

Figure 36:
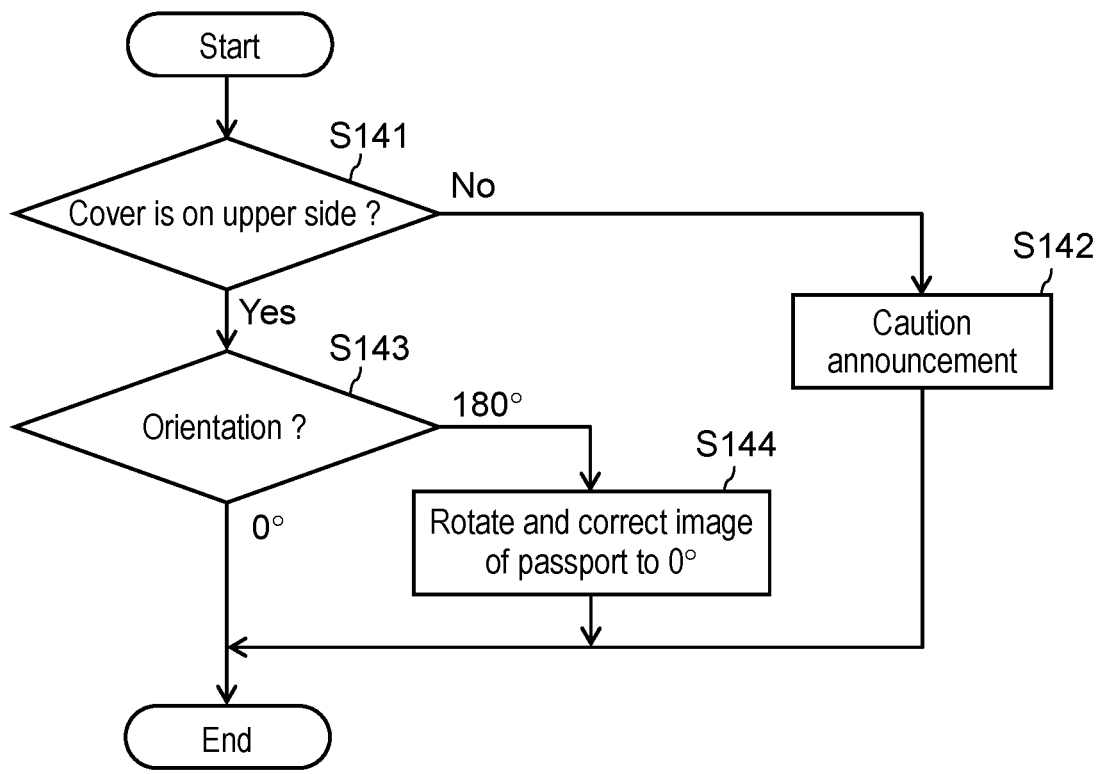
FIG. 36 is a flowchart showing operation of the gate system control device in a modification.

FIG. 36 is a flowchart showing operation of the gate system control device in the modification. The flowchart shown in FIG. 36 corresponds to a processing example of the placing way sensing processing (S11) shown in FIG. 9, and is different processing from the placing way sensing processing (S11).

Namely, in S10 shown in FIG. 9, suppose that the person passes through the entrance gate and enters, and places the passport in the opened state on the placement region.

In this case, the gate system control device determines whether the cover of the passport placed on the placement region is on an upper side, based on the image from above the placement region captured by the camera (S141). In S141, if the cover of the passport placed on the placement region is not on the upper side (No in S141), a caution announcement is given such that the passport is placed with the cover of the passport being on the upper side (S142). Notification part 114 or the like of first sensor 11 may perform the caution announcement.

On the other hand, in S141, if the cover of the passport placed in the placement region is on the upper side (Yes in S141), the gate system control device determines the orientation of the passport in the opened state placed on the placement region, based on the image from above the placement region captured by the camera (S143). In S143, if the orientation of the passport is 0°, that is, is not rotated (0° in S143), the processing ends without performing the correction. Thereafter, reader 112 reads the information indicated in the passport captured in the image of the passport. On the other hand, in S143, in the inverted state where the orientation of the passport is rotated by 180° (180° in S143), the image is rotated and corrected to 0°, and the processing may advance to S12, which is the next processing.

In this manner, based on the image from above the placement region captured by the camera, the gate system control device in the present modification can quickly and precisely determine the orientation of the cover of the passport and the orientation of the passport in the opened state, which has been placed by the person on the placement region. This enables the smooth system operation of the gate system in the present modification to be performed.

For example, the gate system may include guide light that guides the placement of the passport around the placement region. If reader 112 has read the MRZ from the image obtained by imaging the passport by using leakage light of the guide light, first sensor 11 may determine that the passport has been placed. In this case, computer 1000 in FIG. 8 need not include internal light source 1007. Moreover, first sensor 11 needs not include placing way sensor 111.

As described above, the gate system control device according to one or more aspects of the present disclosure, and the method for controlling the gate system have been described, based on the exemplary embodiment. However, the present disclosure should not be limited to this exemplary embodiment. Configurations in which various variations conceived by those skilled in the art are applied to the present exemplary embodiment, and configurations established by combining constituent elements in different exemplary embodiments may also fall within the scope of one or more aspects of the present disclosure, without departing from the gist of the present disclosure. For example, the following cases are also included in the present disclosure.

(1) Each of the above-described devices is specifically a computer system configured with a microprocessor, a ROM, a RAM, a hard disk unit, a display unit, a keyboard, a mouse, and the like. A computer program is stored in the RAM or the hard disk unit. The microprocessor operates in accordance with the computer program, by which each of the devices can achieve a function thereof. Here, the computer program is configured by combining a plurality of command codes indicating instructions to the computer in order to achieve the predetermined function.

(2) Part or all of the constituent elements configuring each of the above-described devices may be configured with one system LSI (Large Scale Integration). The system LSI is a super-multifunctional LSI in which a plurality of components are integrated on one chip and manufactured, and specifically, is a computer system including a microprocessor, a ROM, a RAM, and the like. A computer program is stored in the RAM. The microprocessor operates in accordance with the computer program, by which the system LSI can achieve a function thereof.

(3) Part or all of the constituent elements configuring each of the above-described devices may be configured with an IC card that can be mounted and unmounted on each of the devices, or a single module. The IC card or the module is a computer system configured with a microprocessor, a ROM, a RAM, and the like. The IC card or the module may include the above-described super-multifunctional LSI. The microprocessor operates in accordance with the computer program, by which the IC card or the module can achieve a function thereof. This IC card or this module may have tamper resistance.

(4) The present disclosure may be the above-described methods. Moreover, these methods may be each a computer program implemented by a computer, or may be a digital signal configured of the computer program.

Moreover, the present disclosure may be a recording medium that allows the computer program or the digital signal to be read by a computer, for example, a flexible disk, a hard disk, a CD-ROM an MO, a DVD, a DVD-ROM, a DVD-RAM, a Blu-ray (registered trademark) disc (BD), a semiconductor memory, and the like. Moreover, the present disclosure may be a digital signal recorded on these recording mediums.

Moreover, in the present disclosure, the computer program or the digital signal may be transmitted via an electric communication channel, a wireless or wired communication channel, a network represented by the Internet, data broadcasting, or the like.

Moreover, the present disclosure may be a computer system including a microprocessor and a memory, and the memory may store the above-described computer program, and the microprocessor may operate in accordance with the computer program.

Moreover, the program or the digital signal may be recorded on the recording medium and be transferred, or the program or the digital signal may be transferred via the network or the like, by which the present disclosure may be carried out by another independent computer system.

INDUSTRIAL APPLICABILITY

The present disclosure can be used for a gate system control device and a method for controlling a gate system. Particularly, the present disclosure can be used for a gate system control device that uses a passport for passing through a gate, such as an automatic inspection system configured to automatically perform emigration and immigration inspection using the passport, and a method for controlling a gate system.

REFERENCE MARKS IN THE DRAWINGS 1, 10: gate system control device
2, 11: first sensor
3,12: second sensor
4, 13: controller
14: authentication part
15: IC reader part
16: personal authentication part
17: human detecting sensor
18: signal processor
19: exit gate controller
21: voice announcement part
22, 22a, 22b, 22c: placement region
23, 24, 25, 26, 27: region
23a, 24a, 28: frame
29: image
29a: peripheral region
29b: placement region
30: outside region
31: image sensor
32: face photograph
33: MRZ
34: hologram
100: gate system
111: placing way sensor
112: reader
113: image determiner
114: notification part

The invention claimed is:

1. A gate system control device for controlling a gate system having an exit gate, the gate system control device comprising:
a first sensor configured to sense that a passport of a person who is in the gate system is placed on a placement region;
a second sensor configured to sense that the person is moving; and
a controller configured to control the gate system,
wherein when the first sensor senses that the passport is placed on the placement region and the second sensor, at the same time, senses that the person is moving to the exit gate, the controller causes the gate system to execute processing for notifying the person that the passport is still placed on the placement region.

2. The gate system control device according to claim 1, wherein the controller causes the gate system to execute processing for closing the exit gate as the processing for notifying the person.

3. The gate system control device according to claim 1, wherein the first sensor senses that the passport is placed on the placement region, based on an image of the placement region where the passport is placed, the image being captured by an image sensor.

4. The gate system control device according to claim 3, wherein
the placement region is a rectangular region,
a length of a longer side of the placement region is larger than a length of a longer side of the passport in an opened state,
a length of a shorter side of the placement region is larger than a length of the longer side of the passport in the opened state, and is smaller than the length of the longer side of the passport in the opened state,
the first sensor includes a placing way sensor configured to sense whether or not the passport is placed with a horizontal placement, based on the image, and
when the passport is placed on the placement region such that the longer side of the passport in the opened state is along the longer side of the placement region, the placing way sensor senses that the passport is placed with the horizontal placement.

5. The gate system control device according to claim 4, wherein the placing way sensor generates an image subjected to binarization processing from the image of the placement region where the passport is placed, and senses whether or not the passport is placed with the horizontal placement, using the image subjected to the binarization processing.

6. The gate system control device according to claim 5, wherein the placing way sensor senses a first region or a second region, using the image subjected to the binarization processing, the first region being a region corresponding to the passport, and the second region being a region other than the region corresponding to the passport in the placement region, and the placing way sensor senses whether or not the passport is placed with the horizontal placement, based on the first region or the second region.

7. The gate system control device according to claim 6, wherein the placing way sensor senses whether or not the passport is placed with the horizontal placement, based on a ratio between an area of a predetermined region and an area of the first region or an area of the second region.

8. The gate system control device according to claim 5, wherein, the placing way sensor generates the image subjected to the binarization processing, using an image of the placement region in a state where the passport is not placed as a background image in a background subtraction technique.

9. The gate system control device according to claim 8, wherein the controller adjusts exposure of the image sensor, based on the background image.

10. The gate system control device according to claim 9, wherein the controller adjusts the exposure of the image sensor, based on a ratio between maximum luminance and minimum luminance of pixels included in the background image.

11. The gate system control device according to claim 4, wherein when the passport is not placed with the horizontal placement, the controller causes the gate system to execute processing for notifying the person that the passport is not placed with the horizontal placement.

12. The gate system control device according to claim 1, wherein the first sensor includes a reader configured to read information indicated in the passport.

13. The gate system control device according to claim 12, wherein
the reader acquires a name of the person from the information, and
the controller causes the gate system to execute processing for issuing voice including the name of the person as the processing for notifying the person.

14. The gate system control device according to claim 13, wherein the reader determines whether or not an orientation of the passport is inverted with respect to a reading direction, based on features peculiar to the passport, and when the orientation of the passport is inverted, the reader rotates the image of the placement region by 180° to read the information indicated in the passport.

15. The gate system control device according to claim 14, wherein the features peculiar to the passport is a machine readable zone (MRZ) of the passport.

16. The gate system control device according to claim 12, wherein
the first sensor determines whether or not the person is an object person who can use the gate system, based on the information, and
when the person is not the object person who can use the gate system, the controller causes the gate system to execute processing for notifying that the person is not the object person.

17. The gate system control device according to claim 16, wherein
the reader acquires information of a language used by the person from the information, and
the controller causes the gate system to execute the processing for notifying that the person is not the object person in the language used by the person.

18. The gate system control device according to claim 1, wherein the second sensor senses that the person is moving, based on output of an infrared sensor.

19. A method for controlling a gate system having an exit gate, the method comprising:
a first sensing step of sensing that a passport of a person who is in the gate system is placed on a placement region;
a second sensing step of sensing that the person is moving; and
an execution step of causing the gate system to execute processing for notifying the person that the passport is still placed on the placement region, when the placement of the passport on the placement region is sensed in the first sensing step and, at the same time, the moving of the person is sensed in the second sensing step.

* * * * *